US011970840B2

(12) United States Patent
Takeuchi et al.

(10) Patent No.: US 11,970,840 B2
(45) Date of Patent: Apr. 30, 2024

(54) WORK MACHINE

(71) Applicant: HITACHI CONSTRUCTION MACHINERY CO., LTD., Tokyo (JP)

(72) Inventors: Hiroki Takeuchi, Tsukuba (JP); Shiho Izumi, Hitachinaka (JP); Ryu Narikawa, Mito (JP); Shuuichi Meguriya, Ishioka (JP); Teruki Igarashi, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 722 days.

(21) Appl. No.: 15/734,593

(22) PCT Filed: Mar. 27, 2019

(86) PCT No.: PCT/JP2019/013431

§ 371 (c)(1),
(2) Date: Dec. 3, 2020

(87) PCT Pub. No.: WO2020/194620

PCT Pub. Date: Oct. 1, 2020

(65) Prior Publication Data

US 2021/0230843 A1 Jul. 29, 2021

(51) Int. Cl.
*E02F 9/26* (2006.01)
*E02F 3/32* (2006.01)
(Continued)

(52) U.S. Cl.
CPC ................ *E02F 9/265* (2013.01); *E02F 3/32* (2013.01); *E02F 3/435* (2013.01); *E02F 9/2004* (2013.01);
(Continued)

(58) Field of Classification Search
CPC ... E02F 3/32; E02F 3/435; E02F 3/437; E02F 9/2004; E02F 9/2203; E02F 9/2228;
(Continued)

(56) References Cited

U.S. PATENT DOCUMENTS 5,701,691 A * 12/1997 Watanabe ............... E02F 3/435 701/50
6,275,757 B1 * 8/2001 Watanabe ............. E02F 9/2296 37/234
(Continued)

FOREIGN PATENT DOCUMENTS

EP 0979901 A1 * 2/2000
JP 04-213631 A 8/1992
(Continued)

OTHER PUBLICATIONS

International Search Report of PCT/JP2019/013431 dated Jun. 11, 2019.

(Continued)

*Primary Examiner* — Jonathan L Sample
(74) *Attorney, Agent, or Firm* — MATTINGLY & MALUR, PC

(57) ABSTRACT

An articulated-type front work implement has a boom, an arm, and a bucket that are driven members coupled to each other; a boom cylinder, an arm cylinder and a bucket cylinder that are hydraulic actuators each of which drives a corresponding one of the plurality of driven members on the basis of an operation signal; a plurality of operation members each outputting the operation signal to one of the hydraulic actuators; and a controller that outputs the operation signal to at least one of the plurality of hydraulic actuators or executes area limiting control of correcting the output operation signal such that the front work implement moves on a target surface preset for a work target of the front work implement or within an area above the target surface,
(Continued)

and corrects the operation signal on the basis of information related to operation of the hydraulic actuator.

6 Claims, 19 Drawing Sheets

(51) Int. Cl.

| | |
|---|---|
| ***E02F 3/43*** | (2006.01) |
| ***E02F 9/20*** | (2006.01) |
| ***E02F 9/22*** | (2006.01) |
| ***F15B 15/14*** | (2006.01) |

(52) U.S. Cl.
CPC .......... *E02F 9/2203* (2013.01); *E02F 9/2271* (2013.01); *E02F 9/262* (2013.01); *F15B 15/14* (2013.01); *E02F 9/2285* (2013.01); *E02F 9/2292* (2013.01); *E02F 9/2296* (2013.01)

(58) Field of Classification Search
CPC ..... E02F 9/2235; E02F 9/2271; E02F 9/2285; E02F 9/2292; E02F 9/2296; E02F 9/262; E02F 9/265; F15B 15/14
USPC .......................................................... 701/50
See application file for complete search history.

(56) References Cited

U.S. PATENT DOCUMENTS

| | | | | |
|---|---|---|---|---|
| 7,979,181 | B2 * | 7/2011 | Clark | E02F 9/2029 701/50 |
| 11,168,459 | B2 * | 11/2021 | Narikawa | E02F 9/262 |
| 2011/0318157 | A1 * | 12/2011 | Okamura | E02F 3/436 701/50 |
| 2012/0198831 | A1 * | 8/2012 | Kodaka | E02F 9/2292 60/422 |
| 2015/0027112 | A1 * | 1/2015 | Takebayashi | E02F 3/325 60/393 |
| 2016/0040398 | A1 * | 2/2016 | Kitajima | E02F 3/435 701/50 |
| 2017/0009428 | A1 * | 1/2017 | Hijikata | E02F 9/2292 |
| 2018/0051720 | A1 * | 2/2018 | Hijikata | F15B 11/0423 |
| 2018/0087243 | A1 * | 3/2018 | Ito | E02F 9/22 |
| 2018/0106278 | A1 * | 4/2018 | Amano | F15B 11/044 |
| 2020/0277752 | A1 * | 9/2020 | Igarashi | E02F 9/262 |

FOREIGN PATENT DOCUMENTS

| | | | | | |
|---|---|---|---|---|---|
| JP | 05-187409 | A | | 7/1993 | |
| JP | 08-081977 | A | | 3/1996 | |
| JP | 2007-009432 | A | | 1/2007 | |
| KR | 20160113249 | A | * | 9/2016 | |
| WO | 98/059118 | A1 | | 12/1998 | |
| WO | 2015/137528 | A1 | | 9/2015 | |
| WO | 2018/003176 | A1 | | 1/2018 | |
| WO | WO-2020049623 | A1 | * | 3/2020 | E02F 3/431 |

OTHER PUBLICATIONS

Extended European Search Report received in corresponding European Application No. 19920989.1 dated Oct. 28, 2022.
Translation of the International Preliminary Report on Patentability received in corresponding International Application No. PCT/JP2019/013431 dated Oct. 7, 2021.

* cited by examiner

WORK MACHINE

TECHNICAL FIELD

The present invention relates to a work machine.

BACKGROUND ART

In a work machine such as a construction machine, a front work implement including a boom, an arm and the like is operated by an operator through corresponding operation levers, but it is very difficult for an operator inexperienced with operation to excavate a predetermined area at a certain degree of precision through combined operation of the front work implement. In view of this, in recent years, there has been a known construction technique for semi-automatic control (machine control) of a front work implement of a work machine to avoid excavation below a target surface, for example, on the basis of the position of a bucket of the work machine sensed by performing position sensing of the bucket of the work machine after externally or internally acquiring designed-surface information.

As techniques related to such machine control, for example, Patent Document 1 discloses a construction machine including: a plurality of operation members that are provided corresponding to actuators for driving a front work device, and give commands for the driving of those actuators; and driving means that drive the actuators in accordance with drive commands given through operation of each of the operation members. The construction machine includes: setting means that sets a work target surface of the front work device; and operation instructing means that instruct an operator to perform operation for the front work device such that the front work device is operated along the work target surface according to the degree of proximity of the front work device to the work target surface and the operation direction of the front work device, in a case where the front work device is caused to approach the work target surface by operation of each of the operation members.

PRIOR ART DOCUMENT

Patent Document

Patent Document 1: JP-2007-009432-A

SUMMARY OF THE INVENTION

Problem to be Solved by the Invention

A work machine such as a hydraulic excavator having a machine control function performs excavation construction along a target surface by semi-automatic control of a front work implement. However, the precision of excavation construction varies in some cases between points where the front work implement starts being driven. One of the causes of the variation is differences in magnitude of cylinder internal pressures immediately before the start of driving between operation cycles. That is, if the cylinder internal pressures immediately before the start of driving in machine control differ between operation cycles, differences are generated in the precision in terms of the driving velocity of the front work implement at the start of driving, and this results in variation of the precision of excavation construction in machine control.

The present invention has been contrived in view of the circumstance described above, and an object thereof is to provide a work machine that can improve the precision of excavation construction in machine control.

Means for Solving the Problem

The present application includes a plurality of means for solving the problem described above, and one example thereof is a work machine including: an articulated-type front work implement including a plurality of driven members coupled to each other; a plurality of hydraulic actuators each of which drives a corresponding one of the plurality of driven members on the basis of an operation signal; an operation device that outputs the operation signal to one of the hydraulic actuators, the one hydraulic actuator being intended by an operator; and a controller that outputs the operation signal to at least one of the hydraulic actuators or executes area limiting control of correcting the output operation signal such that the front work implement moves on a target surface preset for a work target of the front work implement or within an area above the target surface. The controller corrects the operation signal on the basis of information related to operation of the hydraulic actuator subjected to the area limiting control, the operation being one immediately before the area limiting control is performed.

Advantages of the Invention

According to the present invention, the precision of excavation construction in machine control can be improved.

Modes for Carrying Out the Invention

In the following, embodiments of the present invention are explained with reference to the drawings. Note that although a hydraulic excavator including a front work implement is explained as an example of a work machine in the present embodiments, the present invention can be applied also to work machines other than hydraulic excavators like wheel loaders as long as the work machines include a similar front work implement.

<First Embodiment>

A first embodiment of the present invention is explained with reference to FIG. 1 to FIG. 12.

Figure 1:
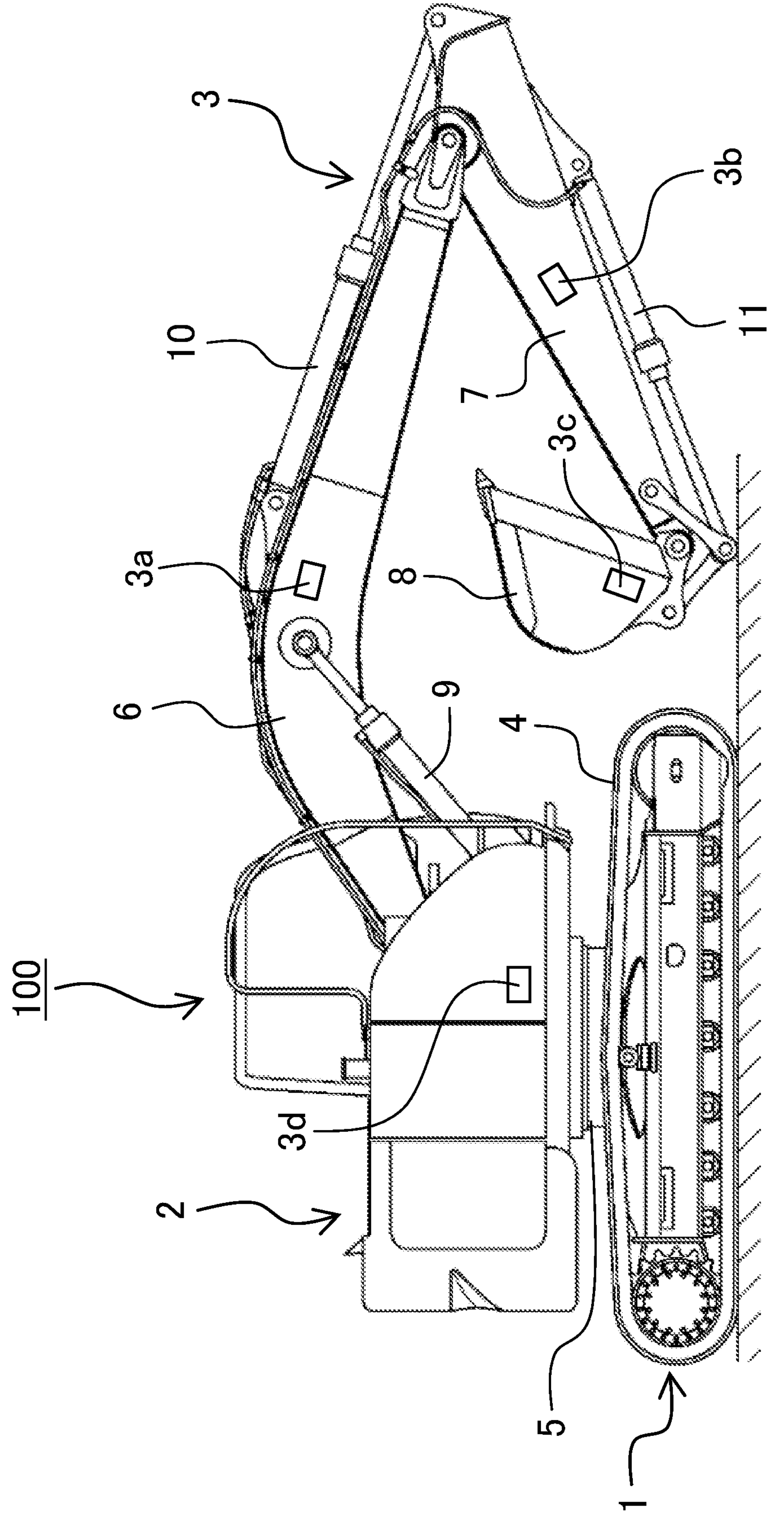
FIG. 1 is a side view schematically illustrating the external appearance of a hydraulic excavator that is an example of a work machine.
Figure 2:
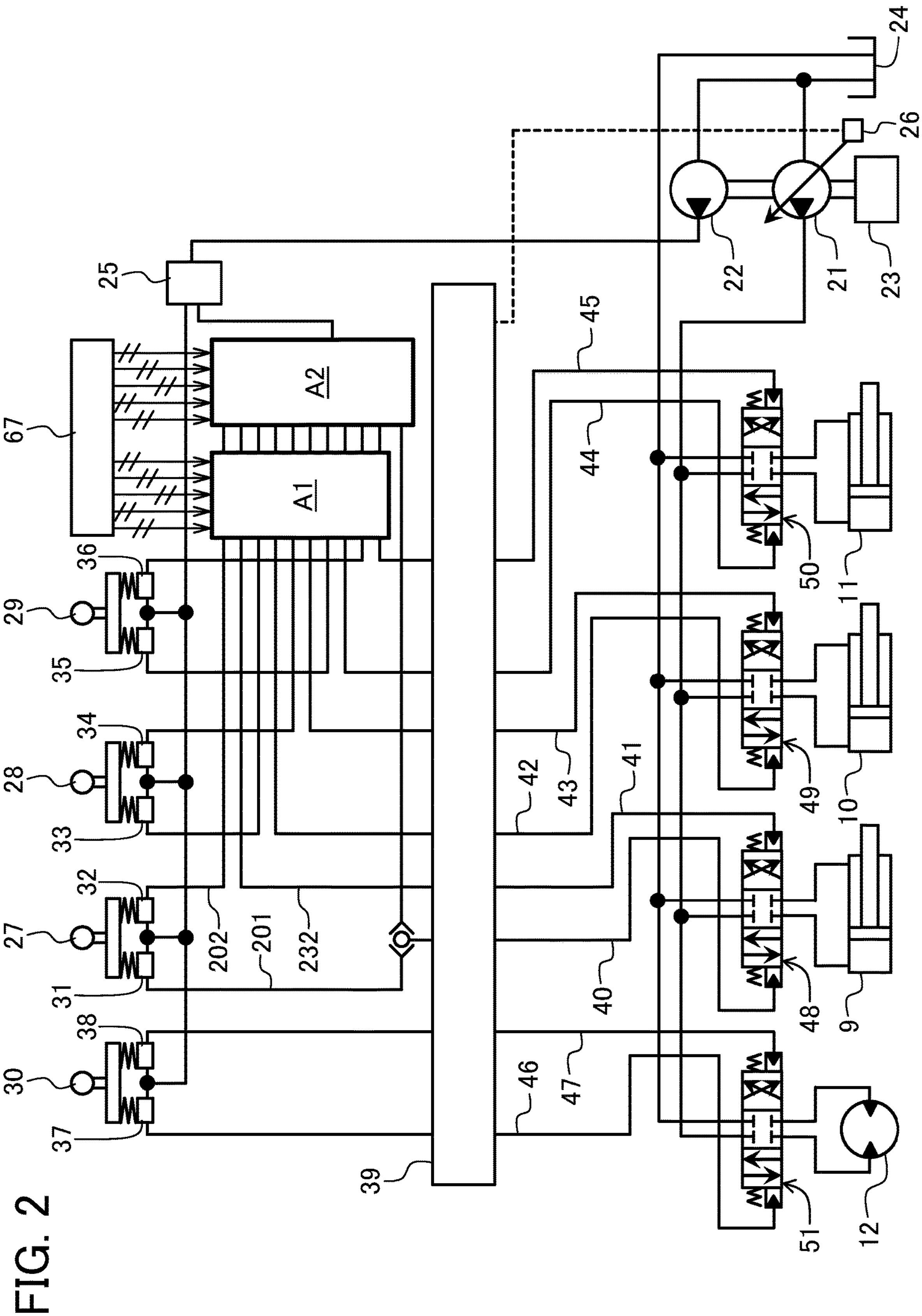
FIG. 2 is a figure illustrating a drive system of the hydraulic excavator along with a controller thereof.
Figure 3:
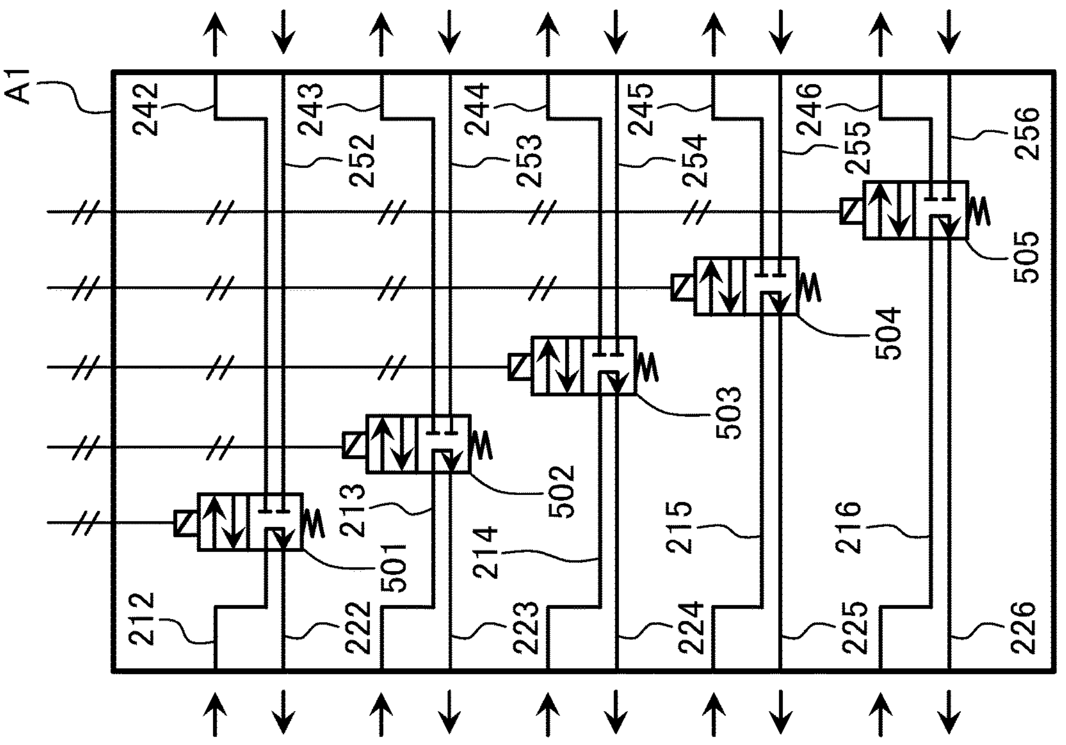
FIG. 3 is a figure illustrating details of a selector hydraulic unit in FIG. 2.
Figure 4:
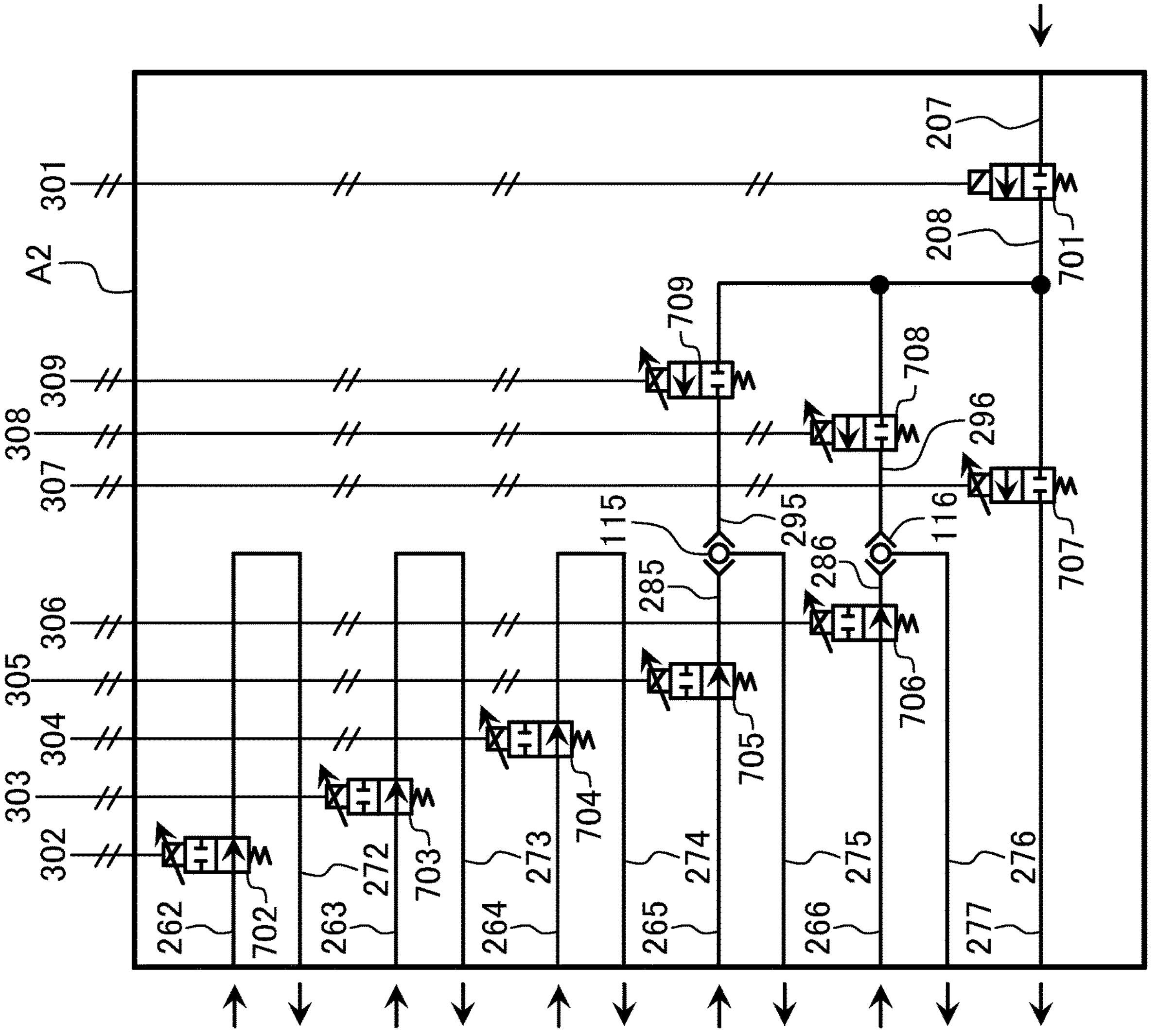
FIG. 4 is a figure illustrating details of a machine-control hydraulic unit in FIG. 2.

FIG. 1 is a side view schematically illustrating the external appearance of a hydraulic excavator that is an example of a work machine according to the present embodiment. In addition, FIG. 2 is a figure illustrating a drive system of the hydraulic excavator along with a controller thereof, FIG. 3 is a figure illustrating details of a selector hydraulic unit in FIG. 2, and FIG. 4 is a figure illustrating details of a machine-control hydraulic unit in FIG. 2.

In FIG. 1, the schematic configuration of a hydraulic excavator 100 includes a lower track structure 1, an upper swing structure 2 arranged at an upper section of the lower track structure 1, and a front work implement 3 connected to the upper swing structure 2.

The lower track structure 1 has left and right travel crawlers 4, and the left and right travel crawlers 4 are driven by unillustrated travel hydraulic motors.

The upper swing structure 2 is coupled with the lower track structure 1 via a swing device 5, and, by being driven by an unillustrated swing hydraulic motor, the swing device 5 can horizontally swing the upper swing structure 2 relative to the lower track structure 1.

The front work implement 3 performs work such as earth and sand excavation (excavation construction), and includes: a boom 6 provided to the upper swing structure 2 such that the boom 6 can be operated to face up and down; an arm 7 provided to the tip of the boom 6 such that the arm 7 can pivot upward and downward; and a bucket 8 as a front implement attachment coupled with the tip of the arm 7 such that the bucket 8 can pivot. In addition, the front work implement 3 is provided with a boom cylinder 9 that drives the boom 6 so as to be operated to face up and down, an arm cylinder 10 that pivotably drives the arm 7 in upward and downward directions, and a bucket cylinder 11 that pivotably drives the bucket 8. The front work implement 3 is caused to operate by expansion or contraction of the cylinder rod of each of the boom cylinder 9, the arm cylinder 10 and the bucket cylinder 11, and this allows for work such as earth and sand excavation.

As illustrated in FIG. 2, in the drive system of the hydraulic excavator 100, a variable displacement pump 21 and a fixed displacement pilot pump 22 are driven by a prime mover 23.

The variable displacement pump 21 serves as a driving source for driving hydraulic actuators such as the boom cylinder 9, the arm cylinder 10, the bucket cylinder 11 and a swing motor 12. Note that although only one variable displacement pump 21 is illustrated in FIG. 2, there may be a plurality of variable displacement pumps 21.

The fixed displacement pilot pump 22 serves as a driving source for driving control valves such as a boom flow control valve 48, an arm flow control valve 49, a bucket flow control valve 50 and a swing flow control valve 51.

A hydraulic operating fluid delivered from the variable displacement pump 21 flows through the boom flow control valve 48, the arm flow control valve 49, the bucket flow control valve 50, the swing flow control valve 51 and the like, and is supplied to hydraulic actuators such as the boom cylinder 9, the arm cylinder 10, the bucket cylinder 11 and the swing motor 12 (hereinafter, referred to as hydraulic actuators 9 to 12 in some cases).

The hydraulic operating fluid having been supplied to the hydraulic actuators 9 to 12 flows through the boom flow control valve 48, the arm flow control valve 49, the bucket flow control valve 50, the swing flow control valve 51 and the like, and is discharged to a tank 24. Note that although not illustrated in FIG. 2, a travel motor, a blade and attachment-related hydraulic actuators can also be driven by a similar method.

The fixed displacement pilot pump 22 is connected to a lock valve 25. Unless the lock valve 25 is switched to a communicating state by an operator through operation of a lock lever or the like provided in a cab, the hydraulic operating fluid delivered from the fixed displacement pilot pump 22 does not flow toward the downstream side of the lock valve 25.

The lock valve 25 is connected to a boom-raising pilot-pressure control valve 31, a boom-lowering pilot-pressure control valve 32, an arm-crowding pilot-pressure control valve 33, an arm-dumping pilot-pressure control valve 34, a bucket-crowding pilot-pressure control valve 35, a bucket-dumping pilot-pressure control valve 36, a swing right-rotation pilot-pressure control valve 37, a swing left-rotation pilot-pressure control valve 38, an unillustrated right-travel pilot-pressure control valve, an unillustrated left-travel pilot-pressure control valve and the like.

The boom-raising pilot-pressure control valve 31 and the boom-lowering pilot-pressure control valve 32 can be opened and closed by a boom operation member 27. The arm-crowding pilot-pressure control valve 33 and the arm-dumping pilot-pressure control valve 34 can be opened and closed by an arm operation member 28. The bucket-crowding pilot-pressure control valve 35 and the bucket-dumping pilot-pressure control valve 36 can be opened and closed by a bucket operation member 29. The swing right-rotation pilot-pressure control valve 37 and the swing left-rotation pilot-pressure control valve 38 can be opened and closed by a swing operation member 30.

The downstream sides of the boom-raising pilot-pressure control valve 31, the boom-lowering pilot-pressure control valve 32, the arm-crowding pilot-pressure control valve 33, the arm-dumping pilot-pressure control valve 34, the bucket-crowding pilot-pressure control valve 35, the bucket-dumping pilot-pressure control valve 36, the swing right-rotation pilot-pressure control valve 37 and the swing left-rotation pilot-pressure control valve 38 are connected with a shuttle block 39. The hydraulic operating fluid discharged from each of the pilot-pressure control valves 31 to 38 is first introduced into the shuttle block 39. The downstream side of the shuttle block 39 is connected with a boom-raising pilot line 40, a boom-lowering pilot line 41, an arm-crowding pilot line 42, an arm-dumping pilot line 43, a bucket-crowding pilot line 44, a bucket-dumping pilot line 45, a swing right-rotation pilot line 46, a swing left-rotation pilot line 47 and the like.

The downstream sides of the boom-raising pilot line 40 and the boom-lowering pilot line 41 are connected with the boom flow control valve 48. The downstream sides of the arm-crowding pilot line 42 and the arm-dumping pilot line 43 are connected with the arm flow control valve 49. The downstream sides of the bucket-crowding pilot line 44 and the bucket-dumping pilot line 45 are connected with the bucket flow control valve 50. The downstream sides of the swing right-rotation pilot line 46 and the swing left-rotation pilot line 47 are connected with the swing flow control valve 51.

The downstream side of the shuttle block 39 is connected also with a regulator 26 attached to the variable displacement pump 21. The regulator 26 has the function of changing the tilting of the variable displacement pump 21 according to an operation amount of each operation member (the boom operation member 27, the arm operation member 28, the bucket operation member 29 and the swing operation member 30) to thereby adjust a delivery flow rate. That is, the shuttle block 39 plays a role of generating a signal pressure to be supplied to the regulator 26 on the basis of an operation signal pressure from each of the pilot-pressure control valves 31 to 38.

The switch amount of each flow control valve (the boom flow control valve 48, the arm flow control valve 49, the bucket flow control valve 50 and the swing flow control valve 51) can be adjusted in accordance with an operation amount of each operation member (the boom operation member 27, the arm operation member 28, the bucket operation member 29 and the swing operation member 30).

In addition, the drive system of the hydraulic excavator 100 includes a controller 67, a shuttle valve 114, a selector hydraulic unit A1 and a machine-control hydraulic unit A2.

The controller 67 receives positional information of each front implement, and, on the basis of the signal, performs control by sending command signals to the selector hydraulic unit A1 and the machine-control hydraulic unit A2 such that pilot pressures appropriate for enabling machine control are produced.

As illustrated in FIG. 3, the selector hydraulic unit A1 has a selector valve 501, a selector valve 502, a selector valve 503, a selector valve 504 and a selector valve 505 arranged therein. The selector valves 501 to 505 are at neutral positions when the selector valves 501 to 505 are not energized (not supplied with a current), and switching of the openings of the selector valves 501 to 505 is performed when the selector valves 501 to 505 are energized (supplied with a current).

In a case where machine control is not performed, command signals 601 to 605 are not output from the controller 67, and the selector valves 501 to 505 are kept at the neutral positions. At this time, the hydraulic operating fluid from the boom-lowering pilot-pressure control valve 32 passes through a pilot line 202, then flows through a pilot line 212 and a pilot line 222 inside the selector hydraulic unit A1, and a pilot line 232 outside the selector hydraulic unit A1, and reaches the shuttle block 39. In addition, the hydraulic operating fluid from the arm-crowding pilot-pressure control valve 33 passes through a pilot line 203, then flows through a pilot line 213 and a pilot line 223 inside the selector hydraulic unit A1, and a pilot line 233 outside the selector hydraulic unit A1, and reaches the shuttle block 39. In addition, the hydraulic operating fluid from the arm-dumping pilot-pressure control valve 34 passes through a pilot line 204, then flows through a pilot line 214 and a pilot line 224 inside the selector hydraulic unit A1, and a pilot line 234 outside the selector hydraulic unit A1, and reaches the shuttle block 39. In addition, the hydraulic operating fluid from the bucket-crowding pilot-pressure control valve 35 passes through a pilot line 205, then flows through a pilot line 215 and a pilot line 225 inside the selector hydraulic unit A1, and a pilot line 235 outside the selector hydraulic unit A1, and reaches the shuttle block 39. In addition, the hydraulic operating fluid from the bucket-dumping pilot-pressure control valve 36 passes through a pilot line 206, then flows through a pilot line 216 and a pilot line 226 inside the selector hydraulic unit A1, and a pilot line 236 outside the selector hydraulic unit A1, and reaches the shuttle block 39. That is, in a case where machine control is not performed, the drive system of the hydraulic excavator 100 forms a circuit in which the hydraulic operating fluid does not flow through the machine-control hydraulic unit A2.

In a case where machine control is performed, the command signals 601 to 605 are output from the controller 67 to thereby execute switching of the openings of the selector valves 501 to 505. At this time, the hydraulic operating fluid from the boom-lowering pilot-pressure control valve 32 passes through the pilot line 202, then flows through the pilot line 212, and a pilot line 242 inside the selector hydraulic unit A1, and flows into the machine-control hydraulic unit A2. After having flowed into the machine-control hydraulic unit A2, the hydraulic operating fluid flows through a pilot line 252 and the pilot line 222 inside the selector hydraulic unit A1, and the pilot line 232 outside the selector hydraulic unit A1, and reaches the shuttle block 39. In addition, the hydraulic operating fluid from the arm-crowding pilot-pressure control valve 33 passes through the pilot line 203, then flows through the pilot line 213 and a pilot line 243 inside the selector hydraulic unit A1, and flows into the machine-control hydraulic unit A2. After having flowed into the machine-control hydraulic unit A2, the hydraulic operating fluid flows through a pilot line 253 and the pilot line 223 inside the selector hydraulic unit A1, and the pilot line 233 outside the selector hydraulic unit A1, and reaches the shuttle block 39. In addition, the hydraulic operating fluid from the arm-dumping pilot-pressure control valve 34 passes through the pilot line 204, then flows through the pilot line 214 and a pilot line 244 inside the selector hydraulic unit A1, and flows into the machine-control hydraulic unit A2. After having flowed into the machine-control hydraulic unit A2, the hydraulic operating fluid flows through a pilot line 254 and the pilot line 224 inside the selector hydraulic unit A1, and the pilot line 234 outside the selector hydraulic unit A1, and reaches the shuttle block 39. In addition, the hydraulic operating fluid from the bucket-crowding pilot-pressure control valve 35 passes through the pilot line 205, then flows through the pilot line 215 and a pilot line 245 inside the selector hydraulic unit A1, and flows into the machine-control hydraulic unit A2. After having flowed into the machine-control hydraulic unit A2, the hydraulic operating fluid flows through a pilot line 255 and the pilot line 225 inside the selector hydraulic unit A1, and the pilot line 235 outside the selector hydraulic unit A1, and reaches the shuttle block 39. In addition, the hydraulic operating fluid from the bucket-dumping pilot-pressure control valve 36 passes through the pilot line 206, then flows through the pilot line 216 and a pilot line 246 inside the selector hydraulic unit A1, and flows into the machine-control hydraulic unit A2. After having flowed into the machine-control hydraulic unit A2, the hydraulic operating fluid flows through a pilot line 256 and the pilot line 226 inside the selector hydraulic unit A1, and the pilot line 236 outside the selector hydraulic unit A1, and reaches the shuttle block 39. That is, in a case where machine control is performed, the drive system of the hydraulic excavator 100 forms a circuit in which the hydraulic operating fluid flows through the machine-control hydraulic unit A2. Accordingly, machine control can be performed by controlling each proportional solenoid valve (see FIG. 5 below) of the machine-control hydraulic unit A2.

As illustrated in FIG. 4, the machine-control hydraulic unit A2 has a solenoid selector valve 701 arranged therein. The opening of the solenoid selector valve 701 is zero (fully closed) when the solenoid selector valve 701 is not energized (not supplied with a current), and the solenoid selector valve 701 is opened when the solenoid selector valve 701 is energized (supplied with a current). When machine control is performed, the solenoid selector valve 701 receives a command signal 301 output from the controller 67, and is opened, and when machine control is not performed, the solenoid selector valve 701 is not energized (not supplied with a current), and the opening of the solenoid selector valve 701 becomes zero (fully closed).

On the downstream side of the boom-raising pilot-pressure control valve 31, a pilot line 201, the shuttle valve 114, and a pilot line 211 are arranged in this order from the upstream side.

The shuttle valve 114 is a high-pressure-prioritizing shuttle valve, and has two inlet ports and one outlet port. One of the inlet ports of the shuttle valve 114 is connected to the pilot line 201, and the outlet port of the shuttle valve 114 is connected with the pilot line 211. The hydraulic operating fluid having been supplied to the boom-raising pilot-pressure control valve 31 is supplied to the pilot line 211 via the pilot line 201 and the shuttle valve 114.

On the other inlet port of the shuttle valve 114, the lock valve 25, a pilot line 207, the solenoid selector valve 701, a pilot line 208, a proportional solenoid valve 707 and a pilot line 277 are arranged in this order from the upstream side. The other inlet port of the shuttle valve 114 is configured to receive an inflow of the hydraulic operating fluid from the fixed displacement pilot pump 22, which inflow does not pass through the boom-raising pilot-pressure control valve 31. That is, the pilot line 211 is supplied with the hydraulic operating fluid independent of an operation amount of the boom operation member 27.

The proportional solenoid valve 707 is a valve for forcibly performing boom raising such that excavation is not performed below a target surface at the time of machine control. The opening of the proportional solenoid valve 707 is zero (fully closed) when the proportional solenoid valve 707 is not energized (not supplied with a current), and the proportional solenoid valve 707 is opened when the proportional solenoid valve 707 is energized (supplied with a current). The opening increases as energization force is increased. The proportional solenoid valve 707 adjusts its opening by receiving a command signal 307 output from the controller 67.

A proportional solenoid valve 702 is a valve for decelerating a boom-lowering velocity such that excavation is not performed below a target surface at the time of machine control. The proportional solenoid valve 702 is fully opened when the proportional solenoid valve 702 is not energized (not supplied with a current), and the proportional solenoid valve 702 is closed when the proportional solenoid valve 702 is energized (supplied with a current). The opening decreases as energization force is increased. The proportional solenoid valve 702 adjusts its opening by receiving a command signal 302 output from the controller 67.

A proportional solenoid valve 703 is a valve for decelerating an arm-crowding velocity such that excavation is not performed below a target surface at the time of machine control and such that machine control is performed precisely. The proportional solenoid valve 703 is fully opened when the proportional solenoid valve 703 is not energized (not supplied with a current), and the proportional solenoid valve 703 is closed when the proportional solenoid valve 703 is energized (supplied with a current). The opening decreases as energization force is increased. The proportional solenoid valve 703 adjusts its opening by receiving a command signal 303 output from the controller 67.

A proportional solenoid valve 704 is a valve for decelerating an arm-dumping velocity such that excavation is not performed below a target surface at the time of machine control and such that machine control is performed precisely. The proportional solenoid valve 704 is fully opened when the proportional solenoid valve 704 is not energized (not supplied with a current), and the proportional solenoid valve 704 is closed when the proportional solenoid valve 704 is energized (supplied with a current). The opening decreases as energization force is increased. The proportional solenoid valve 704 adjusts its opening by receiving a command signal 304 output from the controller 67.

A proportional solenoid valve 705 is a valve for decelerating a bucket-crowding velocity such that excavation is not performed below a target surface at the time of machine control and such that machine control is performed precisely. The proportional solenoid valve 705 is fully opened when the proportional solenoid valve 705 is not energized (not supplied with a current), and the proportional solenoid valve 705 is closed when the proportional solenoid valve 705 is energized (supplied with a current). The opening decreases as energization force is increased. The proportional solenoid valve 705 adjusts its opening by receiving a command signal 305 output from the controller 67.

A proportional solenoid valve 706 is a valve for decelerating a bucket-dumping velocity such that excavation is not performed below a target surface at the time of machine control and such that machine control is performed precisely. The proportional solenoid valve 706 is fully opened when the proportional solenoid valve 706 is not energized (not supplied with a current), and the proportional solenoid valve 706 is closed when the proportional solenoid valve 706 is energized (supplied with increased. The proportional solenoid valve 706 adjusts its opening by receiving a command signal 306 output from the controller 67.

A proportional solenoid valve 708 is a valve for forcibly performing bucket dumping such that a construction surface is finished while the angle of the bucket 8 is kept constant at the time of machine control. The opening of the proportional solenoid valve 708 is zero (fully closed) when the proportional solenoid valve 708 is not energized (not supplied with a current), and the proportional solenoid valve 708 is opened when the proportional solenoid valve 708 is energized (supplied with a current). The opening increases as energization force is increased. The proportional solenoid valve 708 adjusts its opening by receiving a command signal 308 output from the controller 67.

A proportional solenoid valve 709 is a valve for forcibly performing bucket crowding such that a construction surface is finished while the angle of the bucket 8 is kept constant at the time of machine control. The opening of the proportional solenoid valve 709 is zero (fully closed) when the proportional solenoid valve 709 is not energized (not supplied with a current), and the proportional solenoid valve 709 is opened when the proportional solenoid valve 709 is energized (supplied with a current). The opening increases as energization force is increased. The proportional solenoid valve 709 adjusts its opening by receiving a command signal 309 output from the controller 67.

A shuttle valve 115 is a high-pressure-prioritizing shuttle valve, and has two inlet ports and one outlet port. One of the inlet ports of the shuttle valve 115 is connected to a pilot line 285 from the proportional solenoid valve 705, and the outlet port of the shuttle valve 115 is connected with a pilot line 275. The other inlet port of the shuttle valve 115 is connected to a pilot line 295 from the proportional solenoid valve 709. The hydraulic operating fluid from the pilot line 295 does not pass through the bucket-crowding pilot-pressure control valve 35, and flows in from the fixed displacement pilot pump 22. That is, the pilot line 295 is supplied with the hydraulic operating fluid independent of an operation amount of the bucket operation member 29.

A shuttle valve 116 is a high-pressure-prioritizing shuttle valve, and has two inlet ports and one outlet port. One of the inlet ports of the shuttle valve 116 is connected to a pilot line 286 from the proportional solenoid valve 706, and the outlet port of the shuttle valve 116 is connected with a pilot line 276. The other inlet port of the shuttle valve 116 is connected to a pilot line 296 from the proportional solenoid valve 708. The hydraulic operating fluid from the pilot line 296 does not pass through the bucket-dumping pilot-pressure control valve 36, and flows in from the fixed displacement pilot pump 22. That is, the pilot line 296 is supplied with the hydraulic operating fluid independent of an operation amount of the bucket operation member 29.

Note that the selector hydraulic unit A1 and the machine-control hydraulic unit A2 need not necessarily be formed as units. In addition, some of hydraulic components such as the selector valve 501 may be arranged outside the units A1 and A2.

Here, the basic principle of the present embodiment is explained by using FIG. 5 to FIG. 9.

Figure 5:
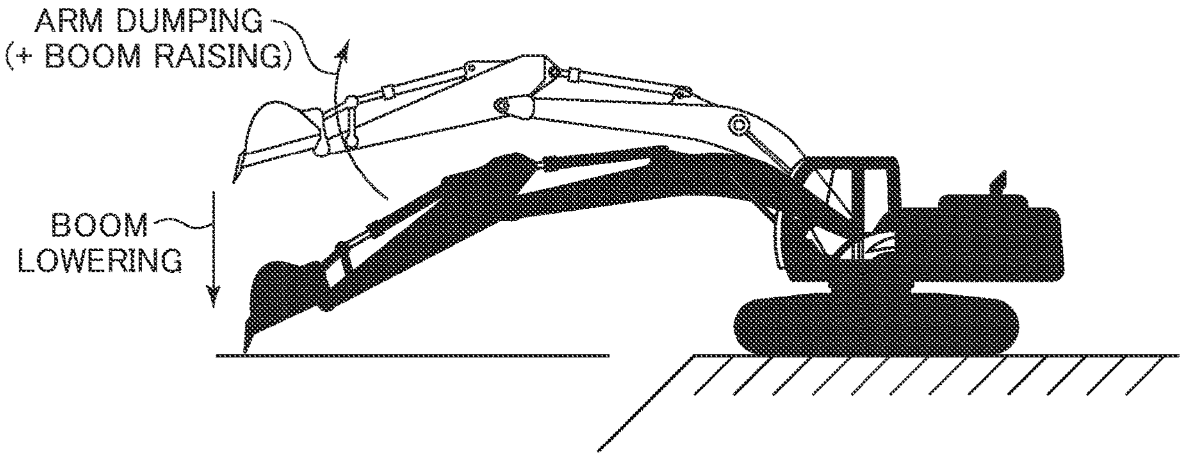
FIG. 5 is a figure illustrating an example of excavation construction by the hydraulic excavator.
Figure 6:
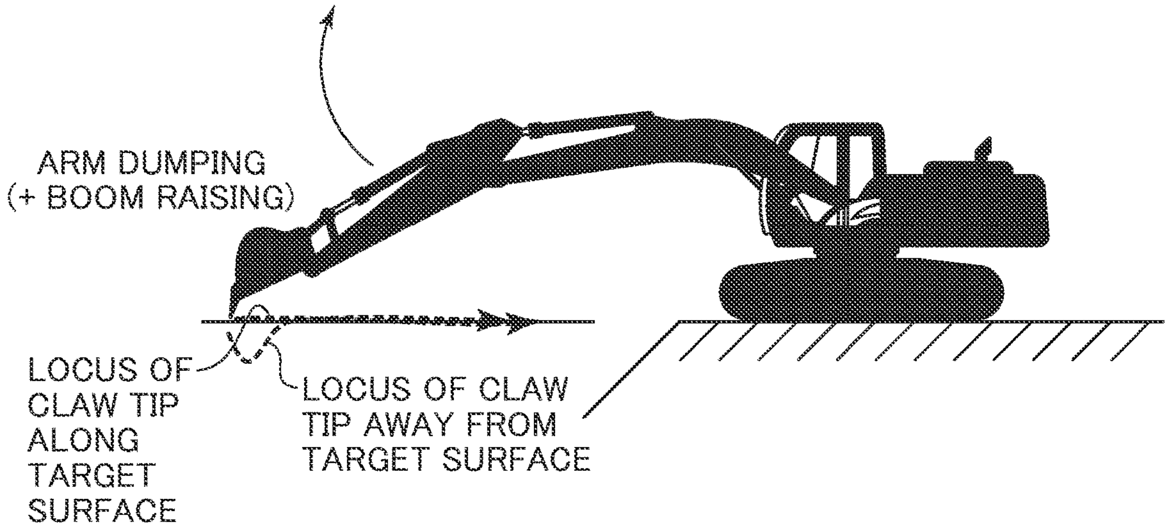
FIG. 6 is a figure illustrating an example of excavation construction by the hydraulic excavator.

FIG. 5 and FIG. 6 are figures each illustrating an example of excavation construction by the hydraulic excavator.

As illustrated in FIG. 5 and FIG. 6, in excavation construction by the hydraulic excavator 100, for example, first in a state in which the boom cylinder 9 is driven to the expansion side by the boom operation member 27 so that the boom 6 is pivoted to a sufficient height (FIG. 5: boom raising), the arm cylinder 10 is driven to the contraction side by the arm operation member 28 until the arm cylinder 10 contracts fully, so that the arm 7 is pivoted (FIG. 5: arm dumping), and next the boom cylinder 9 is driven to the contraction side by the boom operation member 27 so that the front work implement 3 is pivoted and the tip of the bucket 8 is thereby lowered to the position of an excavation-construction target surface (FIG. 5: boom lowering). Next, the arm cylinder 10 is driven to the contraction side so that the arm 7 is pivoted (FIG. 6: arm crowding), and excavation construction is performed. Here, in machine control, control by the controller 67 limits the driving of the boom cylinder 9 to the expansion side (at the time of boom lowering in FIG. 5, etc.) or drives the boom cylinder 9 to the contraction side (at the time of arm crowding in FIG. 6). Thereby, the tip of the bucket 8, for example, of the front work implement 3 is moved along the excavation-construction target surface (area limiting control).

Figure 7:
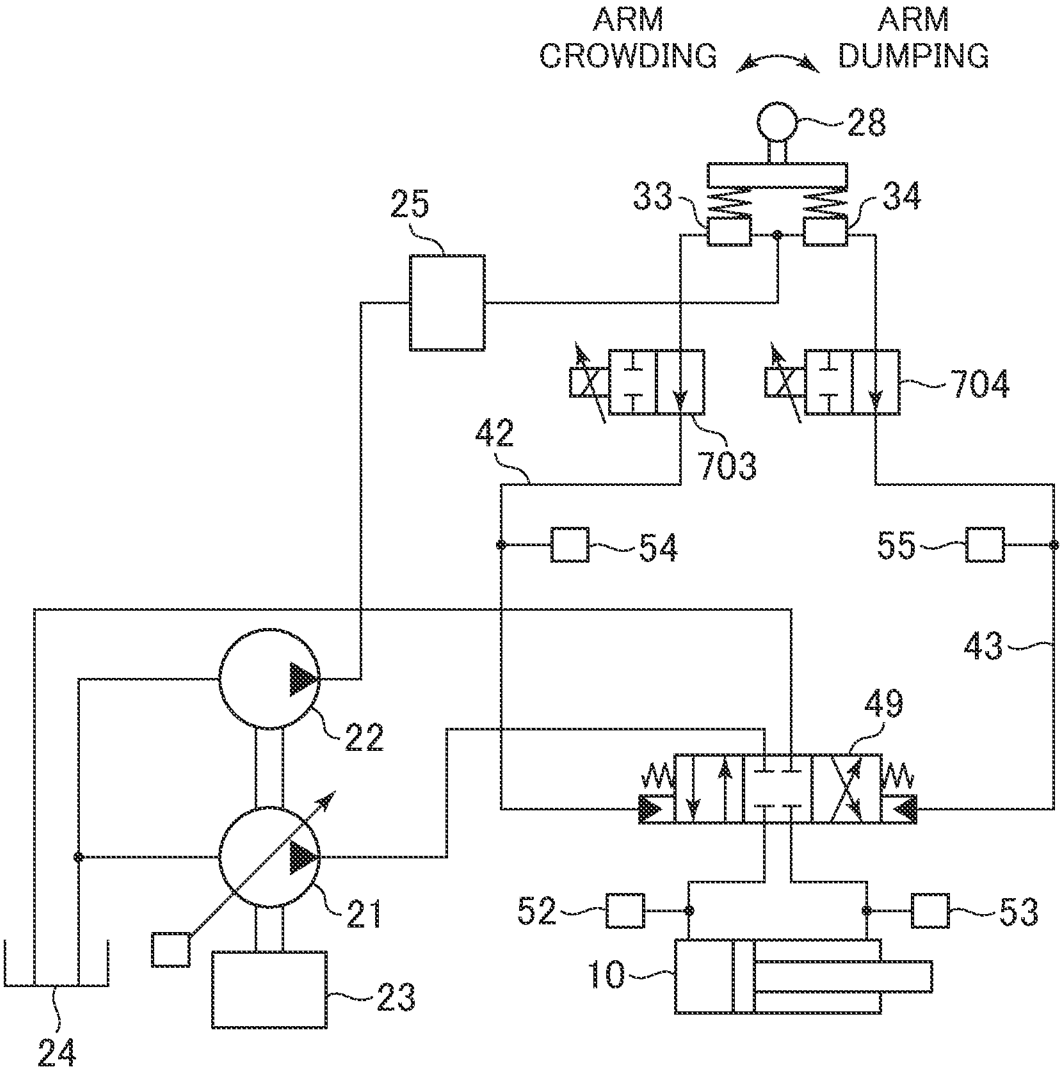
FIG. 7 is a figure illustrating a configuration related to the driving of an arm cylinder out of a configuration of the drive system.

FIG. 7 is a figure illustrating a configuration related to the driving of the arm cylinder out of a configuration of the drive system.

As illustrated in FIG. 7, the drive system related to the driving of the arm cylinder 10 is provided with a bottom-pressure sensor 52 that senses the bottom-side pressure of the arm cylinder 10, a rod-pressure sensor 53 that senses the rod-side pressure of the arm cylinder 10, an arm-crowding pressure-reducing-valve downstream-side pressure sensor 54 that senses the downstream-side pressure of the proportional solenoid valve 703 on the arm-crowding pilot line 42 that connects the arm-crowding pilot-pressure control valve 33 driven by the arm operation member 28 with the arm cylinder 10, and an arm-dumping pressure-reducing-valve downstream-side pressure sensor 55 that senses the downstream-side pressure of the proportional solenoid valve 704 on the arm-dumping pilot line 43 that connects the arm-dumping pilot-pressure control valve 34 with the arm cylinder 10. Note that several configurations including the shuttle block 39 are omitted in FIG. 7 for simplification of explanation.

At the time of arm-dumping operation, the hydraulic fluid from the fixed displacement pilot pump 22 acts on the arm flow control valve 49 via the lock valve 25, the arm-dumping pilot-pressure control valve 34, and the arm-dumping pilot line 43. Thereby, the hydraulic fluid from the variable displacement pump 21 flows into the rod side of the arm cylinder 10 via the arm flow control valve 49. The rod side of the arm cylinder 10 keeps receiving an inflow of the hydraulic fluid until the stroke length of the arm cylinder 10 contracts fully. After the stroke length of the arm cylinder 10 has contracted fully, the hydraulic fluid that is further about to flow into the rod side of the arm cylinder 10 is discharged to the tank 24 through an unillustrated relief valve arranged between the variable displacement pump 21 and the arm flow control valve 49.

Here, the magnitude of the internal pressure of the rod side of arm cylinder 10 varies depending on an operation amount and an operation method of arm-dumping operation until the stroke length of the arm cylinder 10 contracts fully. For example, in a case where arm-dumping operation is performed as full lever operation until the stroke length of the arm cylinder 10 contracts fully from the state where the stroke length of the arm cylinder 10 has expanded fully, the arm cylinder 10 contracts fully with relatively much momentum, and thus the rod-side pressure of the arm cylinder 10 becomes relatively high. In addition, in a case where the stroke length of the arm cylinder 10 is caused to contract fully by arm-dumping operation performed as fine operation, the rod-side pressure of the arm cylinder 10 becomes relatively low.

Next, boom-lowering operation is performed in the state where the arm cylinder 10 has contracted fully, the claw tip of the bucket 8 is positioned on the excavation-construction target surface, and then arm-crowding operation is performed to drive the arm cylinder 10 to the expansion side. The hydraulic fluid from the fixed displacement pilot pump 22 at the time of arm-crowding operation acts on the arm flow control valve 49 via the lock valve 25, the arm-crowding pilot-pressure control valve 33, and the arm-crowding pilot line 42. Thereby, the hydraulic fluid from the variable displacement pump 21 flows into the bottom side of the arm cylinder 10 via the arm flow control valve 49. The hydraulic fluid of the rod side of the arm cylinder 10 flows to the tank 24, and thus the thrust increases gradually. The higher the rod pressure of the arm cylinder 10 immediately before arm-crowding operation is, the smaller the thrust in the cylinder-expansion direction immediately after the arm-crowding operation is.

If arm-crowding operation is performed in a case where the machine control function is enabled, boom-raising pressure-increasing control is performed such that the claw tip of the bucket 8 moves along the target surface while being prevented from penetrating below the target surface. The boom-raising pressure-increasing amount is determined from an arm-crowding operation amount, a pressure acting on the arm flow control valve 49 and the like.

Here, even if arm-crowding operation is performed in similar manners, differences appear in how the arm cylinder 10 is driven in some cases, depending on the magnitude of the rod pressure of the arm cylinder 10. That is, when the rod pressure of the arm cylinder 10 is high, the arm cylinder 10 is relatively slowly driven immediately after arm-crowding operation, and boom pressure-increase is effected during that process. Accordingly, the locus of the claw tip of the bucket 8 tends to follow relatively precisely along an excavation-construction target surface or to float relatively from the excavation-construction target surface. In addition, when the rod pressure of the arm cylinder 10 is low, the arm cylinder 10 is driven relatively fast immediately after arm-crowding operation. Accordingly, the locus of the bucket claw tip immediately after the arm-crowding operation tends to sink down with respect to the excavation-construction target surface. A problem related to the present invention is present here. Separate control methods need to be employed depending on the arm rod pressure.

Figure 8:
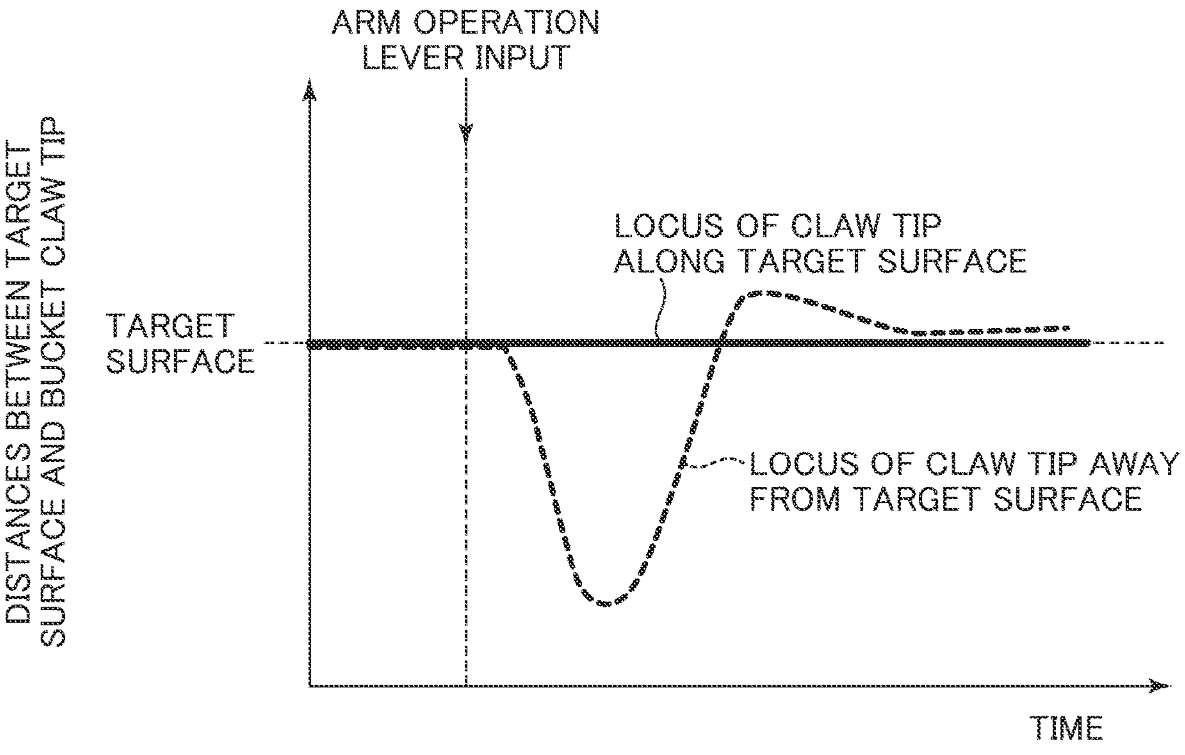
FIG. 8 is a figure illustrating loci of the claw tip of a bucket at the time of arm crowding in a conventional technology.

FIG. 8 is a figure illustrating loci of the claw tip of the bucket at the time of arm crowding in a conventional technology.

As illustrated in FIG. 8, a locus of the claw tip at the time of arm crowding after arm-dumping operation is performed as fine operation coincides with a target surface. On the other hand, it is observed that a locus of the claw tip at the time of arm crowding after arm-dumping operation is performed as full lever operation goes into the target surface. This is caused by the fact that in a case where the rod pressure of the arm cylinder 10 is low, the arm 7 (arm cylinder 10) more easily moves swiftly immediately after arm-crowding operation. In the example of FIG. 8, the influence of a response delay of boom pressure-increasing control is apparent noticeably in the locus of the claw tip of the bucket 8. In this manner, there is a possibility that the behavior of the arm cylinder 10 immediately after arm-crowding operation varies depending on operation situations at the time of arm dumping. Furthermore, although an arm cylinder velocity Va based on an arm-crowding pressure-reducing-valve downstream-side pressure is used in boom pressure-increasing control in the conventional technology, this means that in this control method, the boom pressure-increasing control is effected after the arm-crowding pressure-reducing-valve downstream-side pressure has risen, immediately after arm-crowding operation. Accordingly, the claw tip of the bucket 8 penetrates below the target surface immediately after arm-crowding operation due to a response delay of the boom pressure-increasing control.

Figure 9:
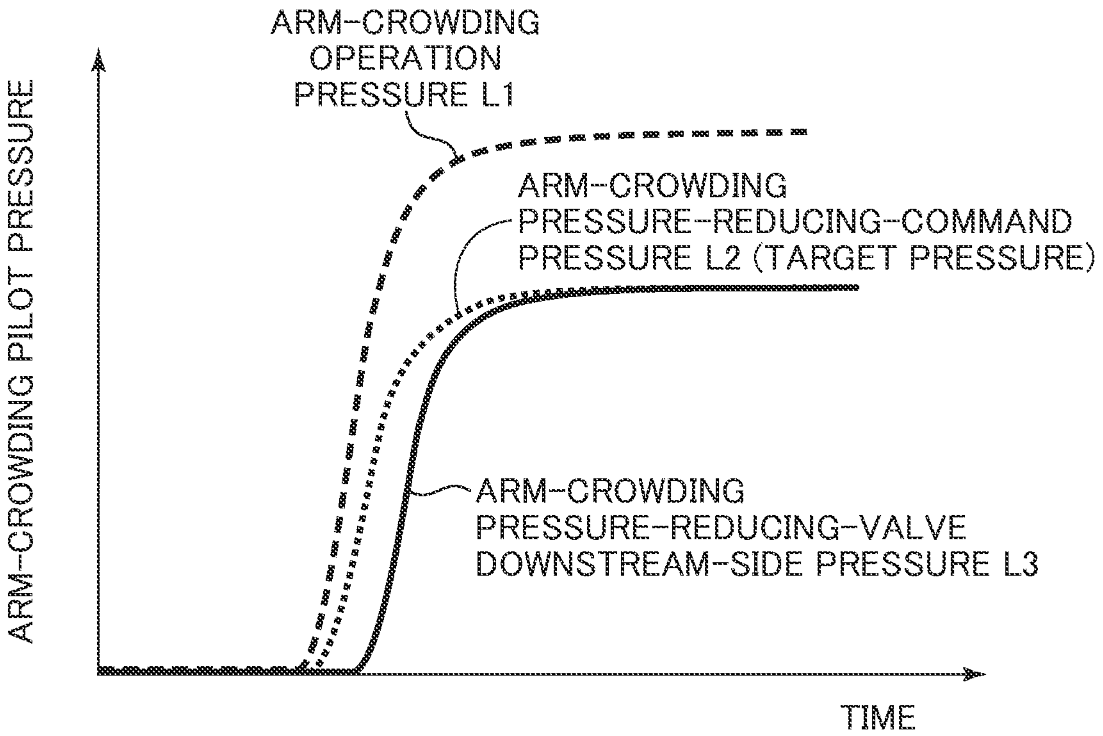
FIG. 9 is a figure illustrating waveforms of an arm-crowding operation pressure, an arm-crowding pressure-reducing-command pressure, and an arm-crowding pressure-reducing-valve downstream-side pressure that are produced when arm-crowding operation is input on an excavation-construction target surface.

FIG. 9 is a figure illustrating waveforms of an arm-crowding operation pressure L1, an arm-crowding pressure-reducing-command pressure L2 and an arm-crowding pressure-reducing-valve downstream-side pressure L3 that are produced when arm-crowding operation is input on an excavation-construction target surface. It can be confirmed that there is a delay of the rising of the arm-crowding pressure-reducing-valve downstream-side pressure from the rising of the arm-crowding pressure-reducing-command pressure immediately after arm-crowding operation. In the present embodiment, the difference of rising between the arm-crowding pressure-reducing-command pressure L2 and the arm-crowding pressure-reducing-valve downstream-side pressure L3 is used to perform boom pressure-increasing control according to the arm cylinder velocity Va based on the arm-crowding pressure-reducing-valve downstream-side pressure and an arm cylinder velocity Vb based on the arm-crowding pressure-reducing-command pressure.

Figure 10:
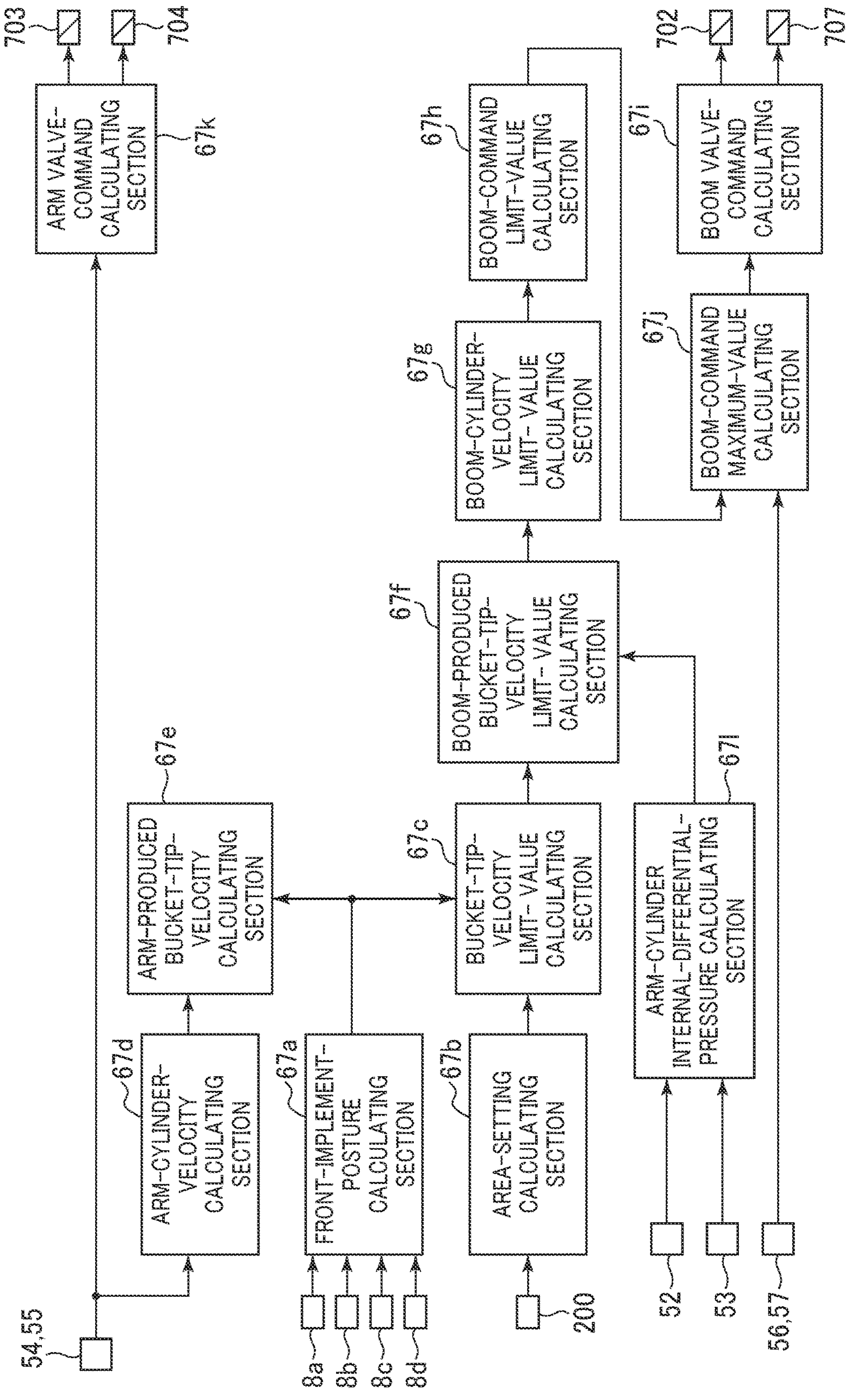
FIG. 10 is a functional block diagram illustrating a processing function of the controller according to a first embodiment.

FIG. 10 is a functional block diagram illustrating a processing function of the controller.

As illustrated in FIG. 10, the controller 67 has functional sections which are a front-implement-posture calculating section 67*a*, an area-setting calculating section 67*b*, a bucket-tip-velocity limit-value calculating section 67*c*, an arm-cylinder-velocity calculating section 67*d*, an arm-produced bucket-tip-velocity calculating section 67*e*, a boom-produced bucket-tip-velocity limit-value calculating section 67*f*, a boom-cylinder-velocity limit-value calculating section 67*g*, a boom-command limit-value calculating section 67*h*, a boom valve-command calculating section 67*i*, a boom-command maximum-value calculating section 67*j*, an arm valve-command calculating section 67*k*, and an arm-cylinder internal-differential-pressure calculating section 671.

The front-implement-posture calculating section 67*a* calculates the position and the posture of each section of the front work implement 3 on the basis of the pivot angles of the boom 6, the arm 7, and the bucket 8, and the forward/backward inclination angle of the upper swing structure 2 that are sensed by angle sensors 3*a* to 3*c* (e.g. IMUs: inertial measurement units, etc.) provided on the boom 6, the arm 7 and the bucket 8, and an inclination angle sensor 3*d* provided on the upper swing structure 2.

The area-setting calculating section 67*b* performs calculation for setting an excavation area on which the tip of the bucket 8 can move by operation by an operator on a setting device 200. In addition, a target surface is set in accordance with an instruction about inclination angle given from the setting device 200.

Here, an unillustrated storage device of the controller 67 stores dimensions of each section of the hydraulic excavator 100 such as the front work implement 3, the upper swing structure 2 or the lower track structure 1. The area-setting calculating section 67*b* computes the position of the tip of the bucket 8 by using, at the front-implement-posture calculating section 67*a*, these pieces of data, the pivot angles sensed by the angle sensors 3*a*, 3*b* and 3*c*, and the inclination angle of the upper swing structure 2 sensed by the inclination angle sensor 3*d*.

On the basis of a distance of the tip of the bucket 8 from the target surface, the bucket-tip-velocity limit-value calculating section 67*c* computes a limit value of a component, perpendicular to the target surface, of a bucket-tip velocity.

The arm-cylinder-velocity calculating section 67*d* estimates the arm cylinder velocity Va on the basis of a command value for the arm flow control valve 49 given through the arm operation member 28 (results of sensing by the arm-crowding pressure-reducing-valve downstream-side pressure sensor 54 and the arm-dumping pressure-reducing-valve downstream-side pressure sensor 55) and the flow rate characteristic of the arm flow control valve 49.

The arm-produced bucket-tip-velocity calculating section 67*e* calculates a bucket-tip velocity produced by the arm 7 on the basis of the arm cylinder velocity and the position and the posture of each section of the front work implement 3 obtained at the front-implement-posture calculating section 67*a*.

The arm-cylinder internal-differential-pressure calculating section 671 calculates a differential pressure P between the bottom side and rod side of the arm cylinder 10 from a result of sensing by the bottom-pressure sensor 52 that senses the bottom-side pressure of the arm cylinder 10 and a result of sensing by the rod-pressure sensor 53 that senses the rod-side pressure of the arm cylinder 10.

On the basis of the differential pressure P obtained at the calculating section 671, the boom-produced bucket-tip-velocity limit-value calculating section 67*f* corrects the bucket-tip velocity produced by the arm 7 obtained at the calculating section 67*e* (arm-cylinder-velocity correction processing), performs conversion from an X-Y coordinate system into an Xa-Ya coordinate system by using the conversion data obtained at the area-setting calculating section 67*b*, calculates a component (bx, by), perpendicular to the target surface, of the bucket-tip velocity produced by the arm 7, and calculates a limit value of a component, perpendicular to the target surface, of a bucket-tip velocity produced by the boom from the limit value of the component, perpendicular to the target surface, of the bucket-tip velocity obtained at the calculating section 67*c*, and the component, perpendicular to the target surface, of the bucket-tip velocity produced by the arm.

Figure 11:
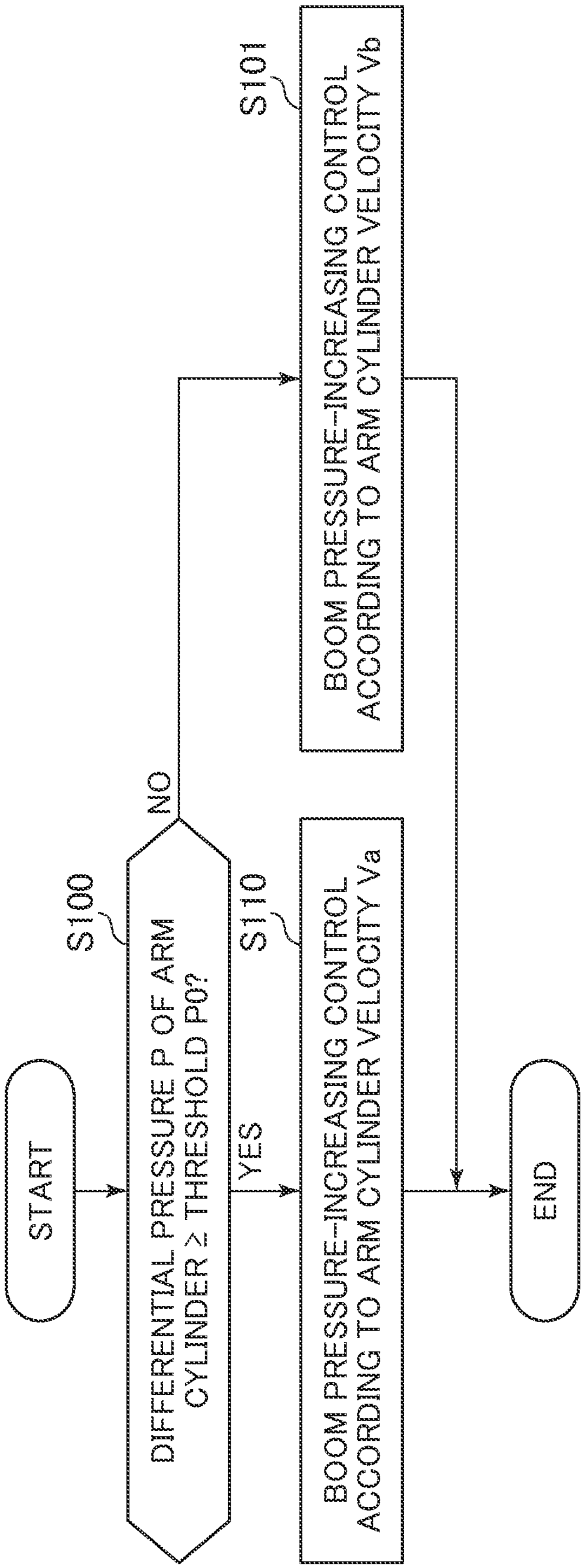
FIG. 11 is a flowchart illustrating arm-cylinder-velocity correction processing according to the first embodiment.

FIG. 11 is a flowchart illustrating the arm-cylinder-velocity correction processing.

In FIG. 11, the boom-produced bucket-tip-velocity limit-value calculating section 67*f* of the controller 67 first decides whether the differential pressure P between the bottom pressure and rod pressure of the arm cylinder 10 at the time of a construction-operation start posture (may not be a full-contraction posture) is equal to or higher than a predetermined value (threshold P0) (Step S100). In a case where the result of the decision is YES, immediately after arm-crowding operation, the boom pressure-increasing control is performed according to a bucket-tip velocity based on the arm-crowding pressure-reducing-valve downstream-side pressure L3 (calculated by using the arm cylinder velocity Va) (Step S110). That is, because the arm cylinder rod pressure immediately before the arm-crowding operation is high, the arm cylinder immediately after the arm-crowding operation is driven at a relatively low velocity, and the boom pressure-increasing control is performed according to the arm cylinder velocity Va based on the arm-crowding pressure-reducing-valve downstream-side pressure that rises slowly after the arm-crowding operation.

In addition, in a case where the result of the decision at Step S100 is NO, immediately after the arm-crowding operation, the boom pressure-increasing control is performed in accordance with a bucket-tip velocity based on the arm-crowding pressure-reducing-command pressure L2 (calculated by using the arm cylinder velocity Vb) (Step S101). That is, because the arm cylinder rod pressure immediately before the arm-crowding operation is low, the arm cylinder immediately after the arm-crowding operation is relatively swiftly driven, and the boom pressure-increasing control is performed in accordance with the arm cylinder velocity Vb based on the arm-crowding pressure-reducing-command pressure that rises fast after the arm-crowding operation.

FIG. 10 is referred to again.

On the basis of the limit value of the component, perpendicular to the target surface, of the bucket-tip velocity produced by the boom 6 and the position and the posture of each section of the front work implement 3, the boom-cylinder-velocity limit-value calculating section 67*g* calculates a limit value of the boom cylinder velocity through coordinate conversion using the conversion data.

On the basis of the flow rate characteristic of the boom flow control valve 48, the boom-command limit-value calculating section 67*h* obtains a command limit value for the boom 6 corresponding to the limit value of the boom cylinder velocity obtained at the calculating section 67*g*.

The boom-command maximum-value calculating section 67*j* compares the limit value of the boom command obtained at the calculating section 67*h* with a command value for the boom flow control valve 48 given through the boom operation member 27 (results of sensing by a boom-raising crowding pressure-reducing-valve downstream-side pressure sensor 56 and a boom-lowering pressure-reducing-valve downstream-side pressure sensor 57 provided in a similar manner to those corresponding to the arm cylinder 10), and outputs the larger one of them.

In a case where the command value output from the boom-command maximum-value calculating section 67*j* is a positive value, the boom valve-command calculating section 67*i* outputs a voltage corresponding to the proportional solenoid valve 707 related to the driving of the boom flow control valve 48 to the boom-raising side.

The arm valve-command calculating section 67*k* receives an input of a command value for the arm flow control valve 49 given through the arm operation member 28 (results of sensing by the arm-crowding pressure-reducing-valve downstream-side pressure sensor 54 and the arm-dumping pressure-reducing-valve downstream-side pressure sensor 55). In a case where the command value is a command value for arm crowding, the arm valve-command calculating section 67*k* outputs a voltage corresponding to the proportional solenoid valve 703 related to the driving of the arm flow control valve 49 to the arm-crowding side, and outputs a voltage of zero to the proportional solenoid valve 704 related to the driving of the arm flow control valve 49 to the arm-dumping side. In a case where the command value is a command value for arm dumping, the arm valve-command calculating section 67*k* performs the opposite.

Effects of the thus-configured present embodiment are explained.

A work machine such as a hydraulic excavator having a machine control function performs excavation construction along a target surface by automatic control of a front work implement. However, the precision of excavation construction of machine control varies between points where the front work implement starts being driven, and one of the causes of the variation is differences in magnitude of cylinder internal pressures immediately before the start of driving between operation cycles. That is, if the cylinder internal pressures immediately before the start of driving in machine control differ between operation cycles, differences are generated in the precision in terms of the driving velocity of the front work implement at the start of driving, and this results in variation of the precision of excavation construction in machine control.

In view of this, in the present embodiment, in the hydraulic excavator 100 including: the articulated-type front work implement 3 including a plurality of driven members (the boom 6, the arm 7 and the bucket 8) coupled to each other; a plurality of hydraulic actuators (the boom cylinder 9, the arm cylinder 10 and the bucket cylinder 11) each of which drives a corresponding one of the plurality of driven members on the basis of an operation signal; an operation device (the boom operation member 27, the arm operation member 28 and the bucket operation member 29) that outputs the operation signal to one of the hydraulic actuators, the one hydraulic actuator being intended by an operator; and the controller 67 that outputs the operation signal to at least one of the hydraulic actuators or executes area limiting control of correcting the output operation signal such that the front work implement moves on a target surface preset for a work target of the front work implement 3 or within an area above the target surface, the controller 67 is configured to correct the operation signal on the basis of information related to operation of the hydraulic actuator subjected to the area limiting control, the operation being one immediately before the area limiting control is performed.

Figure 12:
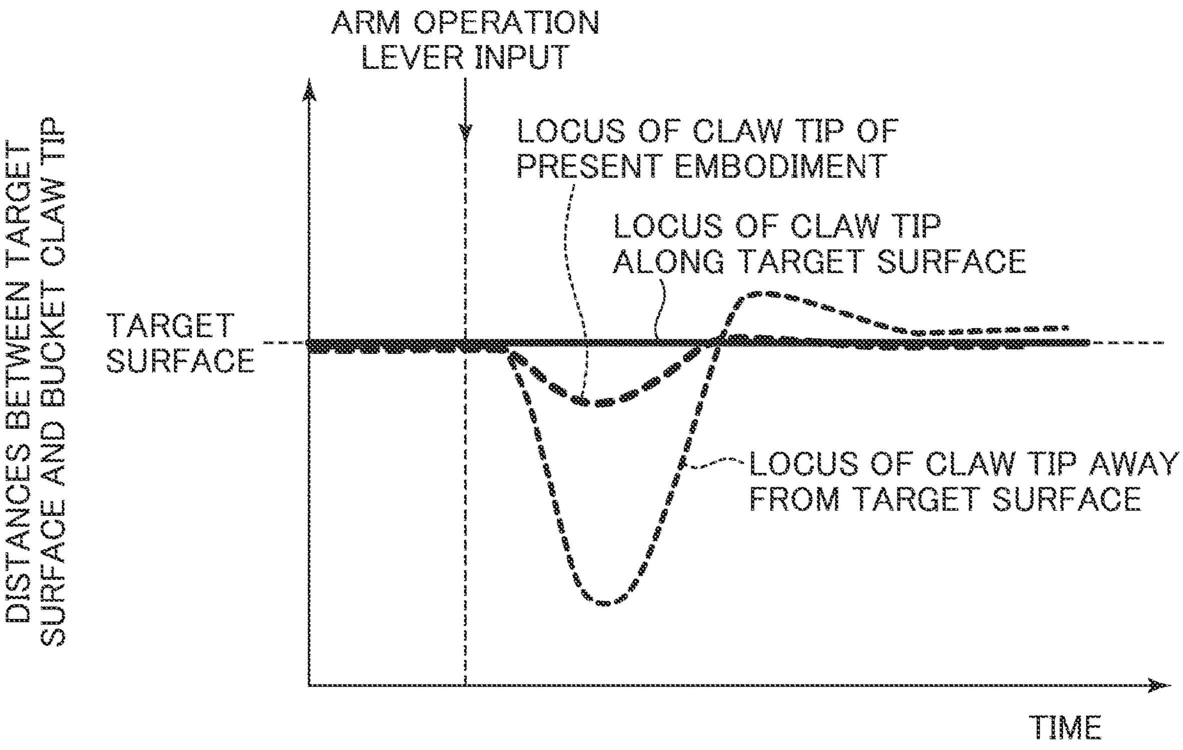
FIG. 12 is a figure illustrating a locus of the claw tip of the bucket at the time of arm crowding in the first embodiment, along with the locus in the conventional technology as a comparative example.

FIG. 12 is a figure illustrating a locus of the claw tip of the bucket at the time of arm crowding in the present embodiment, along with the locus in the conventional technology as a comparative example. As illustrated in FIG. 12, compared with the conventional technology, it can be recognized that the movement locus of the tip of the bucket 8 is more precisely along a target surface in the present embodiment. In this manner, the precision of excavation construction in machine control can be improved in the present embodiment.

<Modification Example of First Embodiment>

A modification example of the first embodiment is explained with reference to FIG. 13 and FIG. 14.

The present modification example is different from the first embodiment in that the bucket-tip-velocity calculation using the arm cylinder velocities Va and Vb is performed according to a ratio obtained on the basis of the differential pressure P between the bottom pressure and rod pressure of the arm cylinder.

Figure 13:
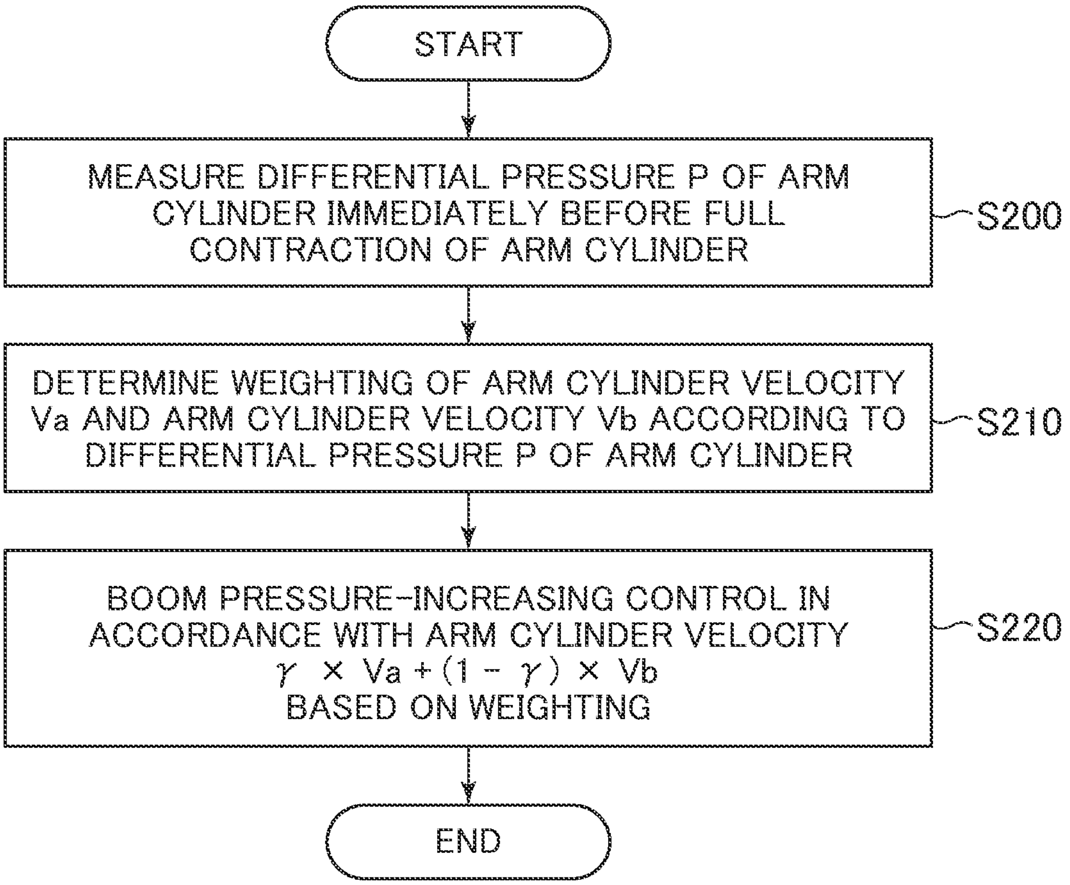
FIG. 13 is a flowchart illustrating the arm-cylinder-velocity correction processing according to a modification example of the first embodiment.
Figure 14:
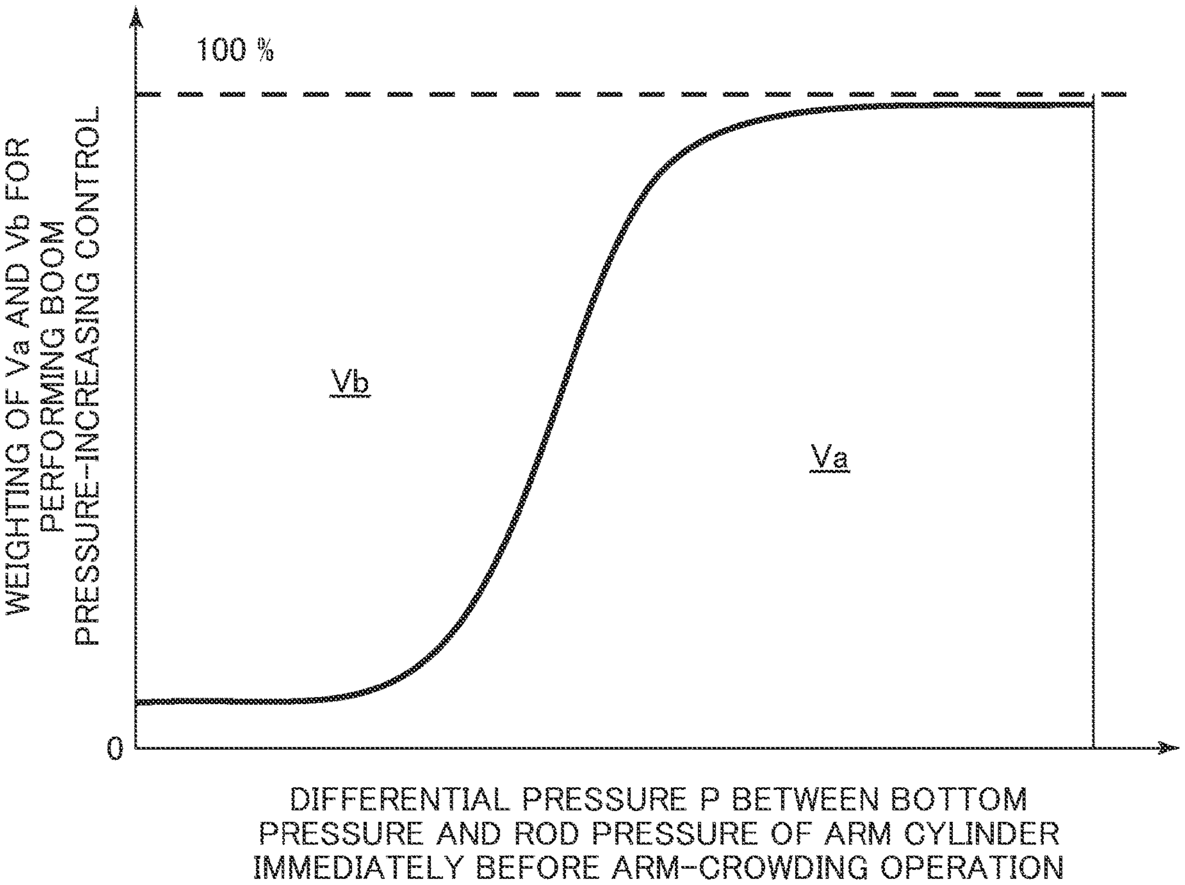
FIG. 14 is a figure illustrating an example of a ratio table presenting a predetermined relationship between a differential pressure between the bottom pressure and rod pressure of the arm cylinder, and a ratio of arm cylinder velocities.

FIG. 13 is a flowchart illustrating the arm-cylinder-velocity correction processing according to the present modification example. In addition, FIG. 14 is a figure illustrating an example of a ratio table presenting a predetermined relationship between the differential pressure between the bottom pressure and rod pressure of the arm cylinder, and a ratio of the arm cylinder velocities. In the figures, members similar to their counterparts in the first embodiment are given the same reference characters, and explanation thereof is omitted.

In FIG. 13, the boom-produced bucket-tip-velocity limit-value calculating section 67*f* of the controller 67 first measures the differential pressure P between the bottom pressure and rod pressure of the arm cylinder 10 at the time of a construction-operation start posture (immediately before the stroke length of the arm cylinder 10 contracts fully) (Step S200), determines a weighting of the arm cylinder velocity Va based on the arm-crowding pressure-reducing-valve downstream-side pressure and the arm cylinder velocity Vb based on the arm-crowding pressure-reducing-command pressure by using the ratio table illustrated in FIG. 12 according to the differential pressure P between the bottom pressure and rod pressure of the arm cylinder (Step S210), and performs boom pressure-increasing control of the arm cylinder velocity computed according to the weighting γ, by using $(\gamma\times Va+(1-\gamma)\times Vb)$ (Step S220). For example, the ratio table is set such that the arm cylinder velocity Vb based on the arm-crowding pressure-reducing-command pressure has larger influence over the boom pressure-increasing control in a case where the differential pressure P is relatively low. For example, the arm cylinder velocity used for the boom pressure-increasing control is represented as 0.2Va+0.8Vb in the case of $\gamma=0.2$.

The configuration is the same as the first embodiment in other respects.

In the thus-configured present modification example also, effects similar to those of the first embodiment can be attained.

<Second Embodiment>

A second embodiment is explained with reference to FIG. 15 to FIG. 17.

In the present embodiment, an operation signal is corrected on the basis of an operation amount a of arm-dumping operation immediately before the stroke length contracts fully.

Figure 15:
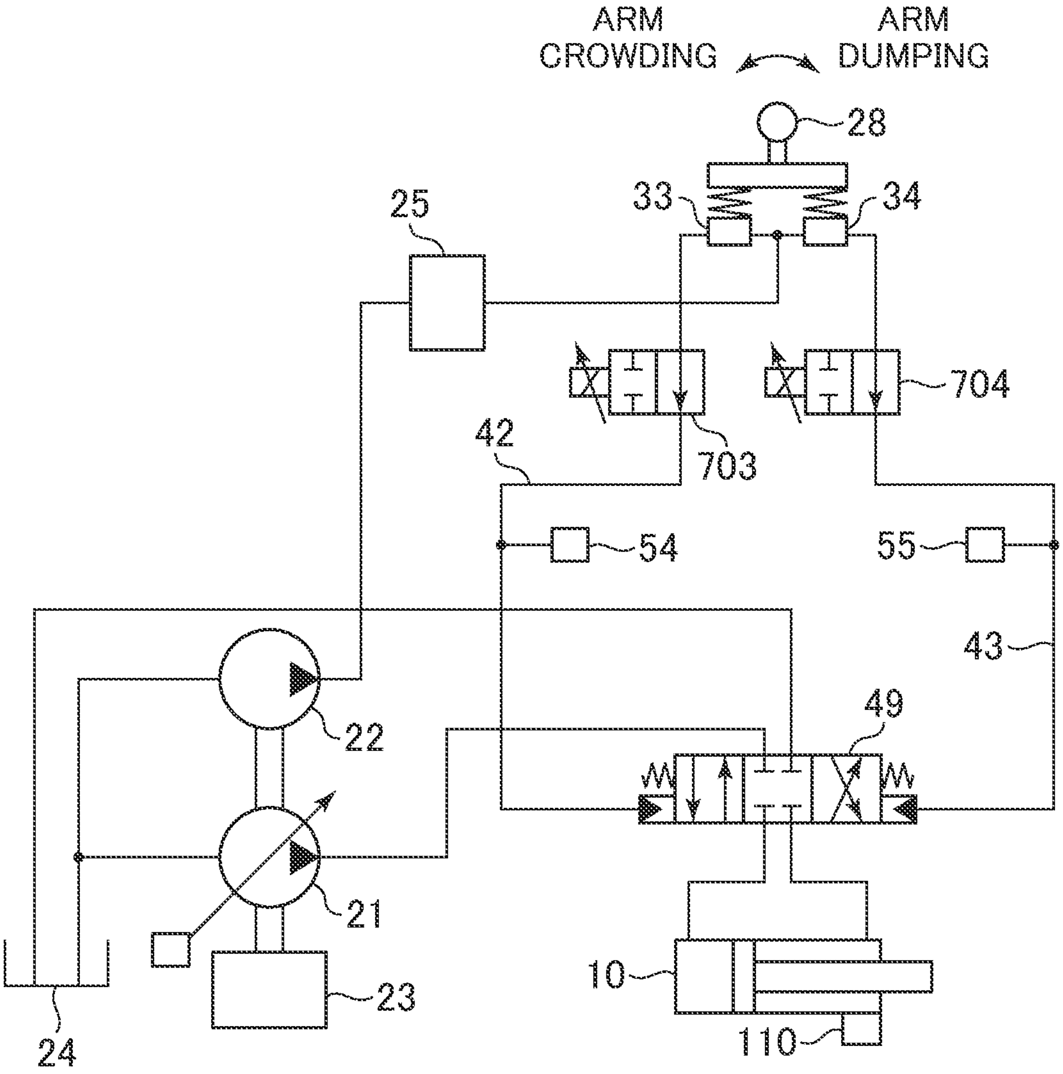
FIG. 15 is a figure illustrating a configuration related to the driving of the arm cylinder out of the configuration of the drive system according to a second embodiment.

FIG. 15 is a figure illustrating a configuration related to the driving of the arm cylinder out of the configuration of the drive system according to the present embodiment. In addition, FIG. 16 is a functional block diagram illustrating the processing function of the controller according to the present embodiment, and FIG. 17 is a flowchart illustrating the arm-cylinder-velocity correction processing according to the present embodiment. In the figures, members similar to their counterparts in the first embodiment are given the same reference characters, and explanation thereof is omitted.

As illustrated in FIG. 15, the drive system related to the driving of the arm cylinder 10 is provided with the arm-crowding pressure-reducing-valve downstream-side pressure sensor 54 that senses the downstream-side pressure of the proportional solenoid valve 703 on the arm-crowding pilot line 42 that connects the arm-crowding pilot-pressure control valve 33 driven by the arm operation member 28 with the arm cylinder 10, the arm-dumping pressure-reducing-valve downstream-side pressure sensor 55 that senses the downstream-side pressure of the proportional solenoid valve 704 on the arm-dumping pilot line 43 that connects the arm-dumping pilot-pressure control valve 34 with the arm cylinder 10, and an arm cylinder stroke sensor 110 that senses the stroke length (rod position) of the arm cylinder 10. Note that the configuration of the drive system related to the driving of the arm cylinder 10 in the present embodiment is different from the first embodiment in that it does not have the bottom-pressure sensor 52 that senses the bottom-side pressure of the arm cylinder 10 and the rod-pressure sensor 53 that senses the rod-side pressure of the arm cylinder 10.

Figure 16:
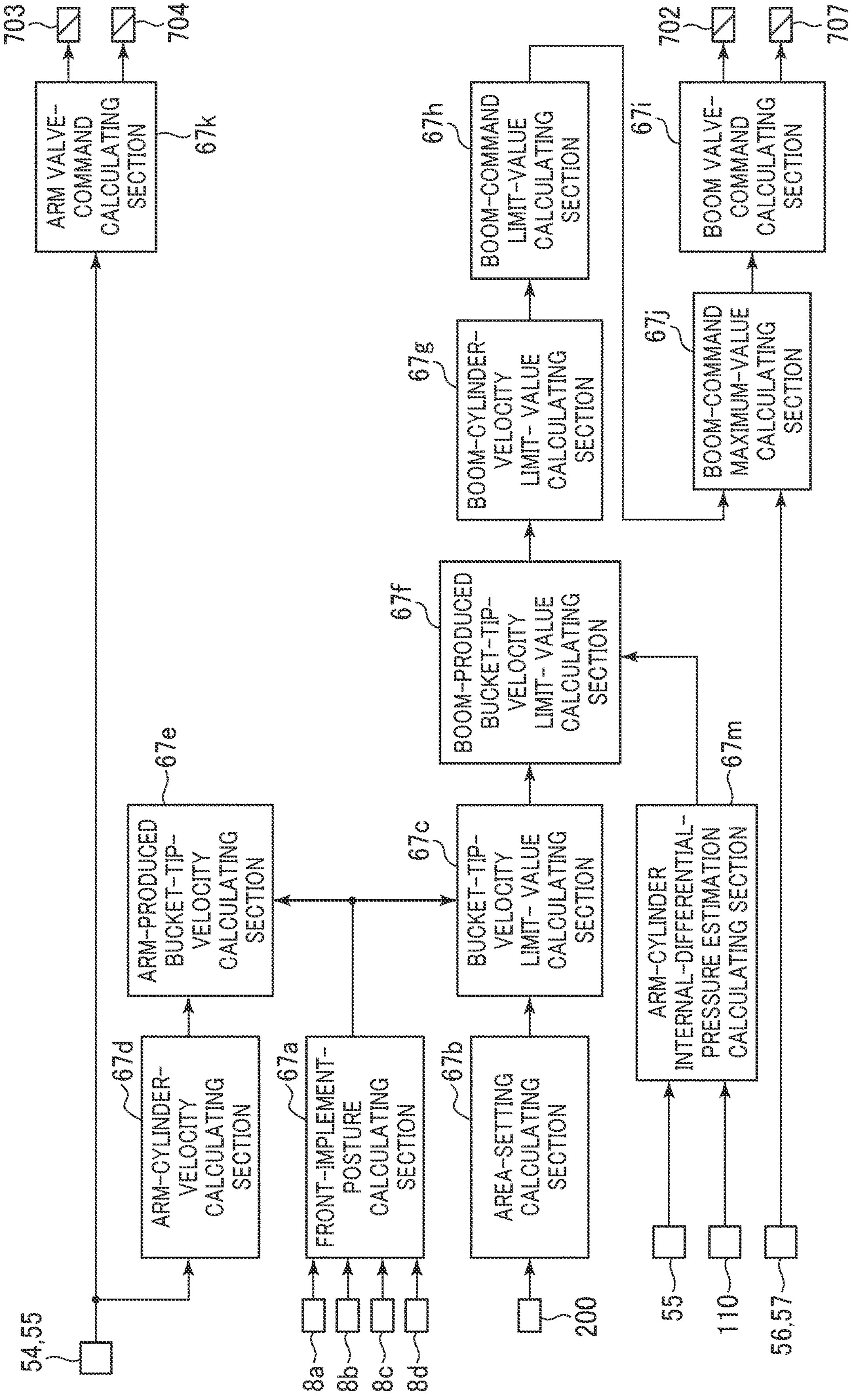
FIG. 16 is a functional block diagram illustrating the processing function of the controller according to the second embodiment.

As illustrated in FIG. 16, the controller 67 has functional sections which are the front-implement-posture calculating section 67*a*, the area-setting calculating section 67*b*, the bucket-tip-velocity limit-value calculating section 67*c*, the arm-cylinder-velocity calculating section 67*d*, the arm-produced bucket-tip-velocity calculating section 67*e*, the boom-produced bucket-tip-velocity limit-value calculating section 67*f*, the boom-cylinder-velocity limit-value calculating section 67*g*, the boom-command limit-value calculating section 67*h*, the boom valve-command calculating section 67*i*, the boom-command maximum-value calculating section 67*j*, the arm valve-command calculating section 67*k*, and an arm-cylinder internal-differential-pressure estimation calculating section 67*m*.

The arm-cylinder internal-differential-pressure estimation calculating section 67*m* calculates the arm-dumping operation amount α of the arm cylinder 10 from a result of sensing by the arm-dumping pressure-reducing-valve downstream-side pressure sensor 55 that senses the downstream-side pressure of the proportional solenoid valve 704 on the arm-dumping pilot line 43 and from a result of sensing by the arm cylinder stroke sensor 110.

Figure 17:
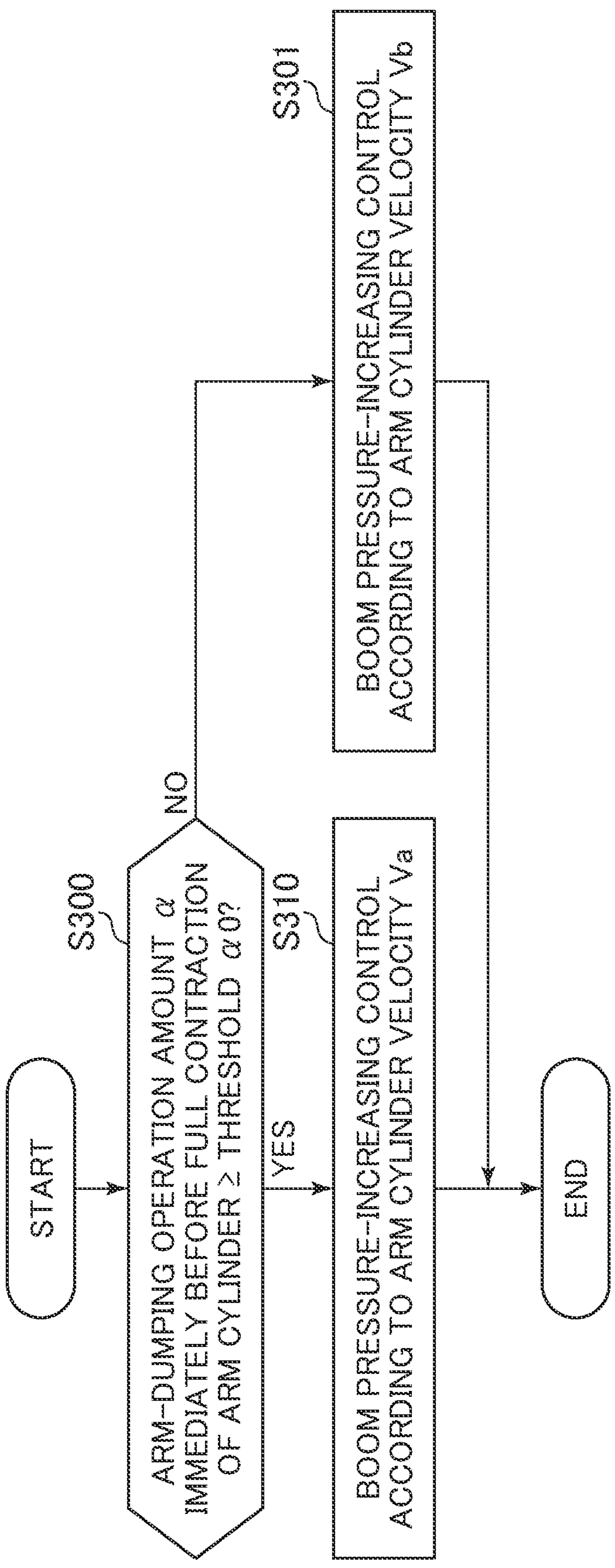
FIG. 17 is a flowchart illustrating the arm-cylinder-velocity correction processing according to the second embodiment.

In FIG. 17, the boom-produced bucket-tip-velocity limit-value calculating section 67*f* of the controller 67 first decides whether the arm-dumping operation amount a of the arm cylinder 10 at the time of a construction-operation start posture (immediately before the stroke length of the arm cylinder 10 contracts fully) is equal to or higher than a predetermined value (threshold α0) (Step S300). In a case where the result of the decision is YES, immediately after arm-crowding operation, the boom pressure-increasing control is performed in accordance with a bucket-tip velocity based on the arm-crowding pressure-reducing-valve downstream-side pressure L3 (calculated by using the arm cylinder velocity Va) (Step S310). That is, because the arm cylinder rod pressure immediately before the arm-crowding operation is high, the arm cylinder immediately after the arm-crowding operation is driven at a relatively low velocity, and the boom pressure-increasing control is performed according to the arm cylinder velocity Va based on the arm-crowding pressure-reducing-valve downstream-side pressure that rises slowly after the arm-crowding operation.

In addition, in a case where the result of the decision at Step 5300 is NO, immediately after the arm-crowding operation, the boom pressure-increasing control is performed according to a bucket-tip velocity based on the arm-crowding pressure-reducing-command pressure L2 (calculated by using the arm cylinder velocity Vb) (Step S301). That is, because the arm cylinder rod pressure immediately before the arm-crowding operation is low, the arm cylinder immediately after the arm-crowding operation is relatively swiftly driven, and the boom pressure-increasing control is performed according to the arm cylinder velocity Vb based on the arm-crowding pressure-reducing-command pressure that rises fast after the arm-crowding operation.

The configuration is the same as the first embodiment in other respects.

In the thus-configured present embodiment also, effects similar to those of the first embodiment can be attained.

Note that although it is configured such that the stroke length of the arm cylinder 10 is sensed by the arm cylinder stroke sensor 110 in the present embodiment, it may be configured, for example, such that a relative angle between the boom 6 and the arm 7 is computed from results of sensing by the angle sensors 3*a* and 3*b* provided to the boom 6 and the arm 7, respectively, of the front work implement 3, and the stroke length of the arm cylinder is computed from a result of the computation.

<Modification Example of Second Embodiment>

A modification example of the second embodiment is explained with reference to FIG. 18 and FIG. 19.

The present modification example is different from the second embodiment in that the bucket-tip-velocity calculation using the arm cylinder velocities Va and Vb is performed according to a ratio obtained on the basis of the arm-dumping operation amount a of the arm cylinder.

Figure 18:
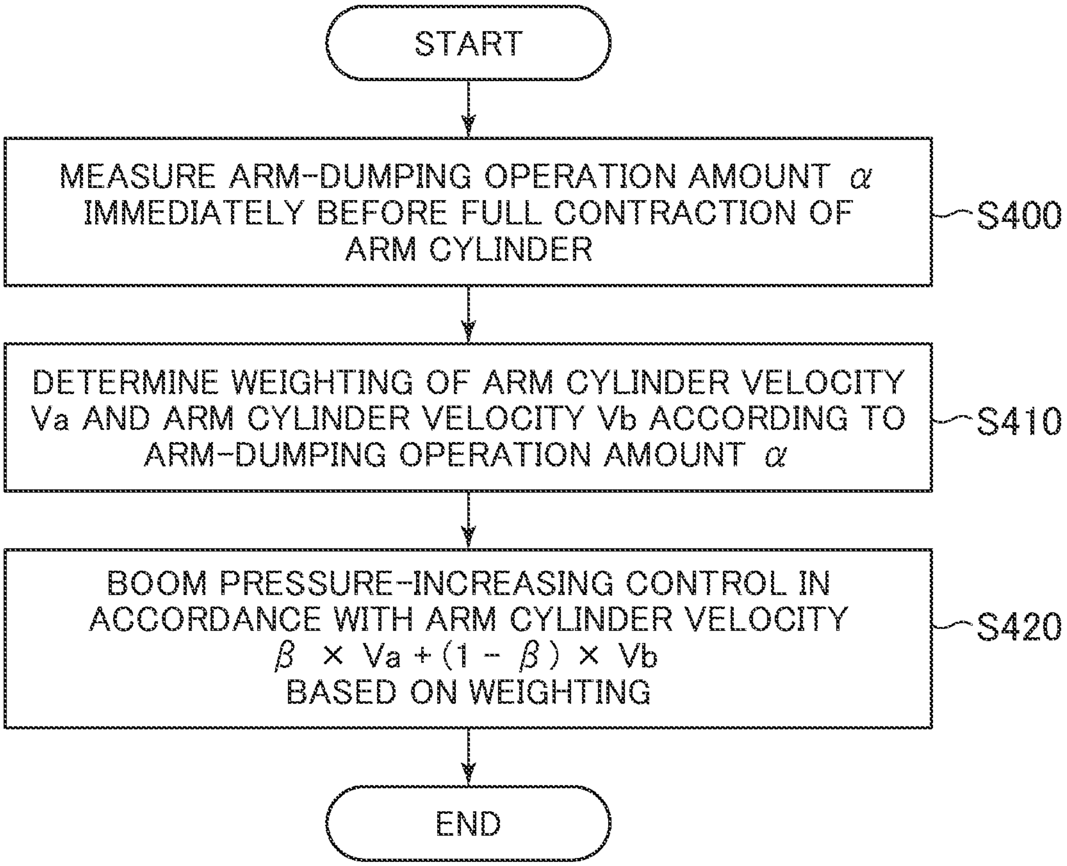
FIG. 18 is a flowchart illustrating the arm-cylinder-velocity correction processing according to a modification example of the second embodiment.

FIG. 18 is a flowchart illustrating the arm-cylinder-velocity correction processing according to the present modification example. In addition, FIG. 19 is a figure illustrating an example of a ratio table presenting a predetermined relationship between an arm-dumping operation amount, and the ratio of the arm cylinder velocities. In the figures, members similar to their counterparts in the first and second embodiments are given the same reference characters, and explanation thereof is omitted.

Figure 19:
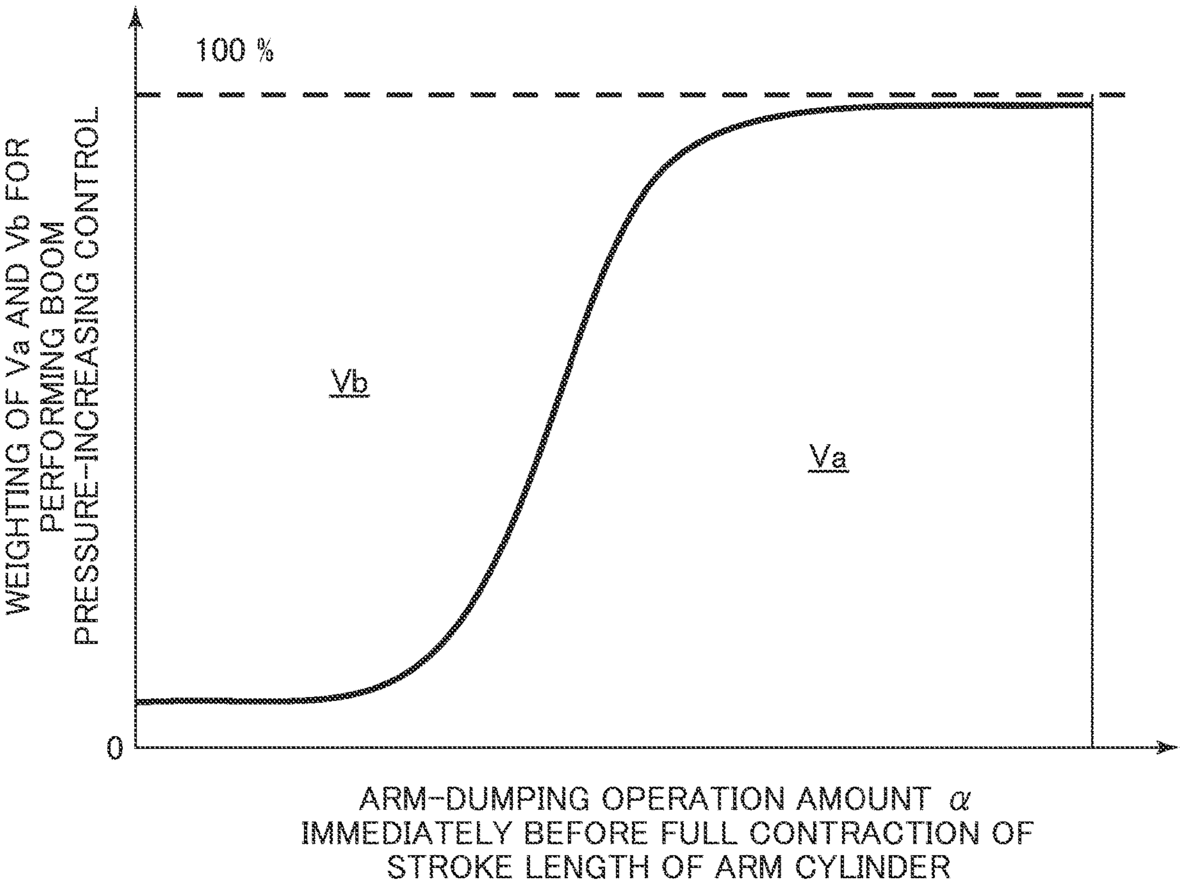
FIG. 19 is a figure illustrating an example of a ratio table presenting a predetermined relationship between an arm-dumping operation amount and the ratio of the arm cylinder velocities.

In FIG. 18, the boom-produced bucket-tip-velocity limit-value calculating section 67*f* of the controller 67 first measures an arm-dumping operation amount of the arm cylinder 10 at the time of a construction-operation start posture (immediately before the stroke length of the arm cylinder 10 contracts fully) (Step S400), determines a weighting of the arm cylinder velocity Va based on the arm-crowding pressure-reducing-valve downstream-side pressure, and the arm cylinder velocity Vb based on the arm-crowding pressure-reducing-command pressure by using the ratio table illustrated in FIG. 19 according to the arm-dumping operation amount a (Step S410), and performs boom pressure-increasing control of the arm cylinder velocity computed in accordance with the weighting β, by using $(\beta\times Va+(1-\beta)\times Vb)$ (Step S420).

The configuration is the same as the first and second embodiments in other respects.

In the thus-configured present modification example also, effects similar to those of the first embodiment can be attained.

<Third Embodiment>

A third embodiment is explained with reference to FIG. 20.

In the present embodiment, an arm-dumping operation pressure is subjected to pressure-reducing control by an arm-dumping proportional solenoid valve such that the arm cylinder rod pressure stays constant independent of the arm-dumping operation pressure.

Figure 20:
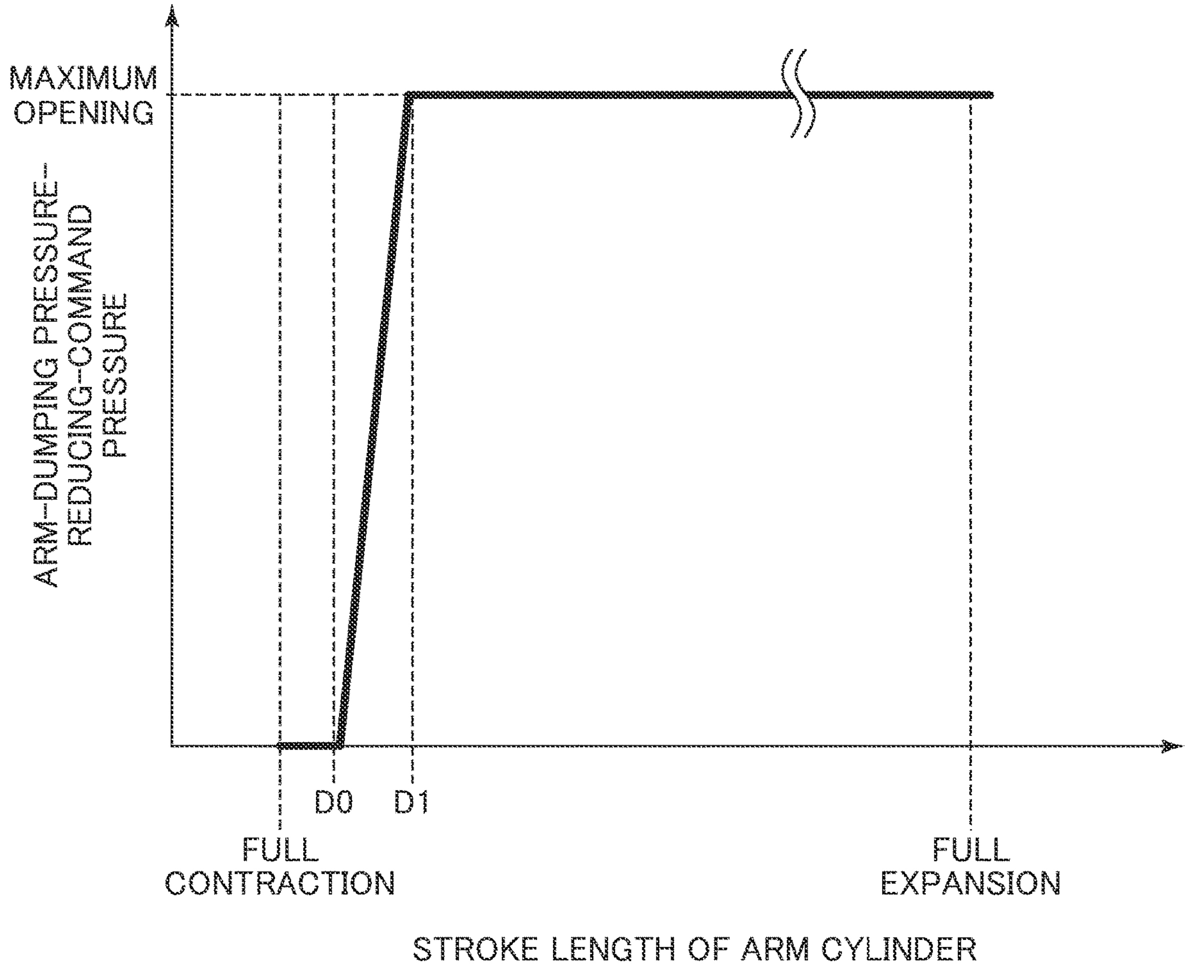
FIG. 20 is a figure illustrating an example of a command-pressure computation table presenting a predetermined relationship between the stroke length of the arm cylinder and an arm-dumping pressure-reducing-command pressure according to a third embodiment.

FIG. 20 is a figure illustrating an example of a command-pressure computation table presenting a predetermined relationship between the stroke length of the arm cylinder and an arm-dumping pressure-reducing-command pressure. In the figure, members similar to their counterparts in the other embodiments and modification examples are given the same reference characters, and explanation thereof is omitted.

When the arm cylinder is caused to contract by arm-dumping operation, the arm-dumping operation pressure is reduced by the arm-dumping proportional solenoid valve in a case where the length left until full contraction becomes equal to or shorter than a constant value D1. Then, when the length is equal to or shorter than a constant value D0, the arm-dumping proportional solenoid valve is fully closed, in order for the arm cylinder not to be driven even if arm-dumping operation is input. Thereby, it becomes possible to make the arm cylinder rod pressure uniform and low independent of arm-dumping operation amounts, and thus it is possible to prevent differences in behavior appeared immediately after arm-crowding operation every time construction operation is performed.

The configuration is the same as the other embodiments and modification examples in other respects.

In the thus-configured present embodiment also, effects similar to those of the other embodiments and modification examples can be attained.

Features of each embodiment described above are explained next.

(1) In the embodiments described above, in a work machine (e.g. the hydraulic excavator 100) including: the articulated-type front work implement 3 including a plurality of driven members (e.g. the boom 6, the arm 7 and the bucket 8) coupled to each other; a plurality of hydraulic actuators (e.g. the boom cylinder 9, the arm cylinder 10 and the bucket cylinder 11) each of which drives a corresponding one of the plurality of driven members on the basis of an operation signal; an operation device (e.g. the boom operation member 27, the arm operation member 28 and the bucket operation member 29) that outputs the operation signal to one of the hydraulic actuators, the one hydraulic actuator being intended by an operator; and the controller 67 that outputs the operation signal to at least one of the hydraulic actuators or executes area limiting control of correcting the output operation signal such that the front work implement moves on a target surface preset for a work target of the front work implement or within an area above the target surface, the controller corrects the operation signal on the basis of information related to operation of the hydraulic actuator subjected to the area limiting control, the operation being one immediately before the area limiting control is performed.

Thereby, the precision of excavation construction in machine control can be improved.

(2) In addition, in the embodiments described above, in the work machine (e.g. the hydraulic excavator 100) of (1), the hydraulic actuator (e.g. the boom cylinder 9, the arm cylinder 10 or the bucket cylinder 11) is a hydraulic cylinder that is caused to perform expansion or contraction operation by a hydraulic operating fluid supplied to a bottom side or rod side thereof. Further, on the basis of a differential pressure between the bottom side and rod side of the hydraulic cylinder immediately before the area limiting control is performed, the controller 67 selects either correction of the operation signal according to a velocity of the hydraulic cylinder based on the operation signal input to the hydraulic cylinder or correction of the operation signal based on a target velocity of the hydraulic cylinder.

(3) In addition, in the embodiments described above, in the work machine (e.g. the hydraulic excavator 100) of (1), the hydraulic actuator (e.g. the boom cylinder 9, the arm cylinder 10 or the bucket cylinder 11) is a hydraulic cylinder that is caused to perform expansion or contraction operation by a hydraulic operating fluid supplied to a bottom side or a rod side thereof. Further, on the basis of a differential pressure between the bottom side and rod side of the hydraulic cylinder immediately before the area limiting control is performed, the controller 67 obtains a ratio of a velocity of the hydraulic cylinder based on the operation signal input to the hydraulic cylinder to a target velocity of the hydraulic cylinder, and corrects the operation signal on the basis of the velocity of the hydraulic cylinder and the target velocity of the hydraulic cylinder according to the ratio.

(4) In addition, in the embodiments described above, in the work machine (e.g. the hydraulic excavator 100) of (1), the hydraulic actuator (e.g. the boom cylinder 9, the arm cylinder 10 or the bucket cylinder 11) is a hydraulic cylinder that is caused to perform expansion or contraction operation by a hydraulic operating fluid supplied to a bottom side or a rod side thereof. Further, on the basis of an operation amount of the operation device according to the hydraulic cylinder immediately before the area limiting control is performed, the controller 67 selects either correction of the operation signal according to a velocity of the hydraulic cylinder based on the operation signal input to the hydraulic cylinder or correction of the operation signal based on a target velocity of the hydraulic cylinder.

(5) In addition, in the embodiments described above, in the work machine (e.g. the hydraulic excavator 100) of (1), the hydraulic actuator (e.g. the boom cylinder 9, the arm cylinder 10 or the bucket cylinder 11) is a hydraulic cylinder that is caused to perform expansion or contraction operation by a hydraulic operating fluid supplied to a bottom side or a rod side thereof. Further, on the basis of an operation amount of the operation device according to the hydraulic cylinder immediately before the area limiting control is performed, the controller 67 obtains a ratio of a velocity of the hydraulic cylinder based on the operation signal input to the hydraulic cylinder to a target velocity of the hydraulic cylinder, and corrects the operation signal on the basis of the velocity of the hydraulic cylinder and the target velocity of the hydraulic cylinder according to the ratio.

(6) In addition, in the embodiments described above, in the work machine (e.g. the hydraulic excavator 100) of any one of (1) to (5), the hydraulic actuator (e.g. the boom cylinder 9, the arm cylinder 10 or the bucket cylinder 11) is a hydraulic cylinder that is caused to perform expansion or contraction operation by a hydraulic operating fluid supplied to a bottom side or a rod side thereof. Further, on the basis of a stroke length of the hydraulic cylinder, the controller 67 controls a hydraulic fluid amount of the hydraulic operating fluid supplied to the rod side of the hydraulic cylinder.

<Notes>

Note that the present invention is not limited to the embodiments described above, but includes various modification examples and combinations within the scope not deviating from the gist of the present invention. In addition, the present invention is not limited to embodiments including all the configurations explained in the embodiments described above, but includes embodiments in which some of the configurations are removed. In addition, the configurations, functions and the like described above may be realized by designing some or all of them, for example, by an integrated circuit or by other means. In addition, the configurations, functions and the like described above may be realized by software by a processor interpreting and executing a program that realizes the functions.

DESCRIPTION OF REFERENCE CHARACTERS

1: Lower track structure
2: Upper swing structure
3: Front work implement
3*a* to 3*c*: Angle sensor
3*d*: Inclination angle sensor
4: Travel crawler
5: Swing device
6: Boom
7: Arm
8: Bucket
9: Boom cylinder
10: Arm cylinder
11: Bucket cylinder
12: Swing motor
21: Variable displacement pump
22: Fixed displacement pilot pump
23: Prime mover
24: Tank
25: Lock valve
26: Regulator
27: Boom operation member
28: Arm operation member
29: Bucket operation member
30: Swing operation member
31: Boom-raising pilot-pressure control valve
32: Boom-lowering pilot-pressure control valve
33: Arm-crowding pilot-pressure control valve
34: Arm-dumping pilot-pressure control valve

35: Bucket-crowding pilot-pressure control valve
36: Bucket-dumping pilot-pressure control valve
37: Swing right-rotation pilot-pressure control valve
38: Swing left-rotation pilot-pressure control valve
39: Shuttle block
40: Boom-raising pilot line
41: Boom-lowering pilot line
42: Arm-crowding pilot line
43: Arm-dumping pilot line
44: Bucket-crowding pilot line
45: Bucket-dumping pilot line
46: Swing right-rotation pilot line
47: Swing left-rotation pilot line
48: Boom flow control valve
49: Arm flow control valve
50: Bucket flow control valve
51: Swing flow control valve
52: Bottom-pressure sensor
53: Rod-pressure sensor
54: Arm-crowding pressure-reducing-valve downstream-side pressure sensor
55: Arm-dumping pressure-reducing-valve downstream-side pressure sensor
56: Crowding pressure-reducing-valve downstream-side pressure sensor
57: Pressure-reducing-valve downstream-side pressure sensor
67: Controller
67*a*: Front-implement-posture calculating section
67*b*: Area-setting calculating section
67*c*: Calculating section
67*c*: Limit-value calculating section
67*d*: Arm-cylinder-velocity calculating section
67*e*: Calculating section
67*e*: Bucket-tip-velocity calculating section
67*f*: Limit-value calculating section
67*g*: Calculating section
67*g*: Limit-value calculating section
67*h*: Calculating section
67*h*: Limit-value calculating section
67*i*: Boom valve-command calculating section
67*j*: Maximum-value calculating section
67*k*: Arm valve-command calculating section
67*l*: Calculating section
67*l*: Arm-cylinder internal-differential-pressure calculating section
67*m*: Arm-cylinder internal-differential-pressure estimation calculating section
100: Hydraulic excavator
110: Arm cylinder stroke sensor
114 to 116: Shuttle valve
200: Setting device
201 to 208, 211 to 216, 222 to 226, 232 to 236, 242 to 246, 252 to 256, 275 to 277, 285, 286, 296: Pilot line
301 to 309: Command signal
501 to 505: Selector valve
601 to 605: Command signal
701: Solenoid selector valve
702 to 709: Proportional solenoid valve

The invention claimed is:

1. A work machine comprising:
a front work implement including a boom, an arm, and a bucket;
a plurality of hydraulic actuators including a boom cylinder that drives the boom, an arm cylinder that drives the arm, and a bucket cylinder that drives the bucket;
an operation device that outputs an operation signal to the plurality of hydraulic actuators; and
a controller that outputs the operation signal to the boom cylinder based on the speed of the arm cylinder or performs boom-raising pressure-increasing control of correcting the operation signal such that the bucket moves on a target surface preset for a work target of the front work implement or within an area above the target surface, wherein
when an arm-dumping operation is performed by the operation device, the arm cylinder rotates the arm by being driven to a contraction side by supplying hydraulic fluid to a rod-side, and when the arm-crowding operation is performed by the operation device, the arm cylinder performing excavation construction by rotating the arm by being driven to an expansion side by supplying hydraulic fluid to a bottom-side, and
immediately after performing the arm-crowding operation by the operation device, the controller performs the boom-raising pressure-increasing control based on a speed of the arm cylinder whose raising in the arm-crowding operation has been corrected based on a rod pressure of the arm cylinder immediately before the arm-crowding operation.

2. The work machine according to claim 1, wherein
the controller performs the boom-raising pressure-increasing control based on the speed of the arm cylinder whose raising in the arm-crowding operation has been corrected based on a differential pressure between the bottom side and rod side of the arm cylinder immediately before the boom-raising pressure-increasing control is performed.

3. The work machine according to claim 2, wherein
on a basis of a differential pressure existing between the bottom side and rod side of the arm cylinder immediately before the boom-raising pressure-increasing control is performed, the controller selects either correction of the operation signal according to a velocity of the arm cylinder based on the operation signal input to the arm cylinder or correction of the operation signal based on a target velocity of the arm cylinder.

4. The work machine according to claim 2, wherein
on a basis of a differential pressure existing between the bottom side and rod side of the arm cylinder immediately before the boom-raising pressure-increasing control is performed, the controller obtains a ratio of a velocity of the arm cylinder based on the operation signal input to the arm cylinder to a target velocity of the arm cylinder, and corrects the operation signal on a basis of the velocity of the arm cylinder and the target velocity of the arm cylinder according to the ratio.

5. The work machine according to claim 1, wherein
on a basis of an operation amount of the operation device corresponding to the arm cylinder immediately before the boom-raising pressure-increasing control is performed, the controller selects either correction of the operation signal according to a velocity of the arm cylinder based on the operation signal input to the arm cylinder or correction of the operation signal based on a target velocity of the arm cylinder.

6. The work machine according to claim 1, wherein
on a basis of an operation amount of the operation device corresponding to the arm cylinder immediately before the boom-raising pressure-increasing control is performed, the controller obtains a ratio of a velocity of the arm cylinder based on the operation signal input to the arm cylinder to a target velocity of the arm cylinder, and corrects the operation signal on a basis of the velocity of the arm cylinder and the target velocity of the arm cylinder according to the ratio.

* * * * *